US009984571B2

(12) United States Patent
Sachdev et al.

(10) Patent No.: US 9,984,571 B2
(45) Date of Patent: May 29, 2018

(54) THREE-BODY VEHICLE-BASED OBJECT TRACKING AND NOTIFICATION SYSTEMS

(71) Applicant: GM Gobal Technology Operations LLC, Detroit, MI (US)

(72) Inventors: Anil K. Sachdev, Rochester Hills, MI (US); Nathan F. Thompson, Sterling Heights, MI (US); Anil Singh Bika, Rochester Hills, MI (US); Aravind Gangumalla, Novi, MI (US); Jenne-tai Wang, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days. days.

(21) Appl. No.: 15/455,310

(22) Filed: Mar. 10, 2017

(65) Prior Publication Data

US 2017/0263123 A1   Sep. 14, 2017

Related U.S. Application Data

(60) Provisional application No. 62/307,694, filed on Mar. 14, 2016.

(51) Int. Cl.
*G08G 1/123* (2006.01)
*G08G 1/127* (2006.01)
(Continued)

(52) U.S. Cl.
CPC ......... *G08G 1/127* (2013.01); *G06K 9/00771* (2013.01); *G08B 19/00* (2013.01); *H04L 67/00* (2013.01); *H04W 4/02* (2013.01)

(58) Field of Classification Search
None
See application file for complete search history.

(56) References Cited

U.S. PATENT DOCUMENTS 7,753,272 B2 *  7/2010  Harper ............... G06Q 10/087
                                                    235/382
8,629,767 B2    1/2014  Stefanovski et al.
(Continued)

OTHER PUBLICATIONS

Innovative key fob brings NFC capabilities to all mobile phones; http://www.gizmag.com/nfc-key-fob/17881/, Feb. 14, 2011.
(Continued)

*Primary Examiner* — Adolf Dsouza
(74) *Attorney, Agent, or Firm* — Cynthia R. Parks; Parks IP Law LLC

(57) ABSTRACT

A system implemented at a user structure, to monitor a tracked object using a three-body arrangement including the user, a tracked object, and a controlling apparatus. The system has a data storage device including user-presence module code causing a processor to determine, based on wireless sensing, whether the user has entered a first space having a boundary external to the user structure, or has left the space. Object-presence module code causes the processor to determine, based on tracked-object-presence data, whether the tracked object is within a second space. And the storage device includes alert-module code to, in response to determining that, depending on the embodiment, (i) the user entered or exited the first space and (ii) the tracked object is or is not present within the second space, initiate provision of a system-user alert communication to indicate that the tracked object is not present within the second sensed space.

29 Claims, 8 Drawing Sheets

(51) Int. Cl.
   *G06K 9/00*      (2006.01)
   *G08B 19/00*     (2006.01)
   *H04W 4/02*      (2018.01)
   *H04L 29/08*     (2006.01)

(56) References Cited

U.S. PATENT DOCUMENTS

| | | |
|---|---|---|
| 8,917,174 B2 | 12/2014 | Morgan, Jr. |
| 8,941,478 B2 | 1/2015 | Mirle et al. |
| 9,099,000 B2 | 8/2015 | Schalk |
| 2013/0099922 A1* | 4/2013 | Lohbihler ............ G08B 13/184 340/539.17 |
| 2014/0210671 A1* | 7/2014 | Larose ...................... G01S 5/06 342/450 |
| 2015/0061856 A1 | 3/2015 | Raman |
| 2015/0077253 A1 | 3/2015 | Spahl |
| 2015/0249908 A1 | 9/2015 | Le |

OTHER PUBLICATIONS

ZOMM wireless leash for Mobile Phones, Bluetooth Speakerphone and Personal Safety Device; http://www.amazon.com/ZOMM-Wireless-Bluetooth-Speakerphone-Personal/dp/B003N3J6F, Jan. 5, 2016.

* cited by examiner

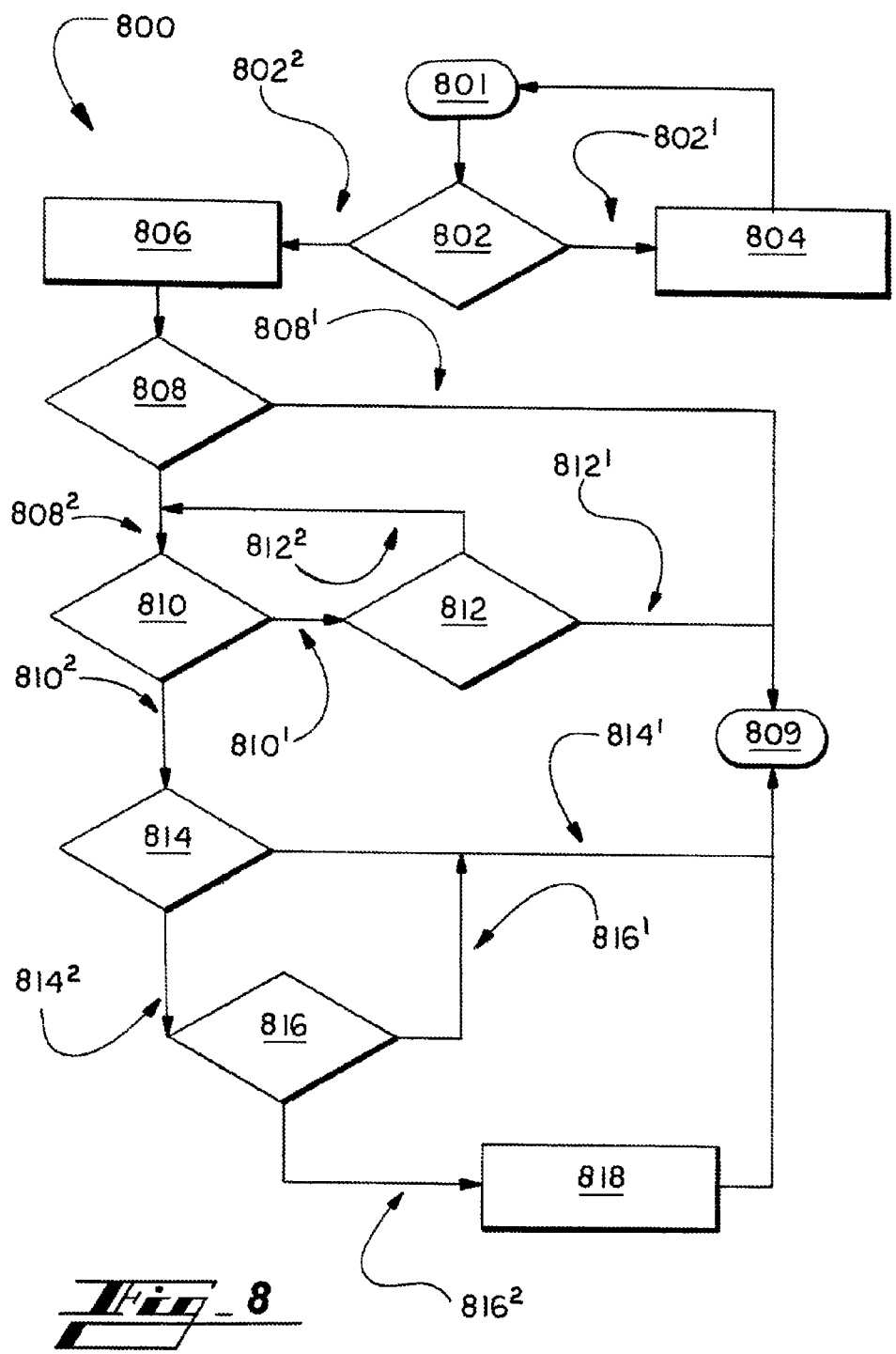
Fig_8

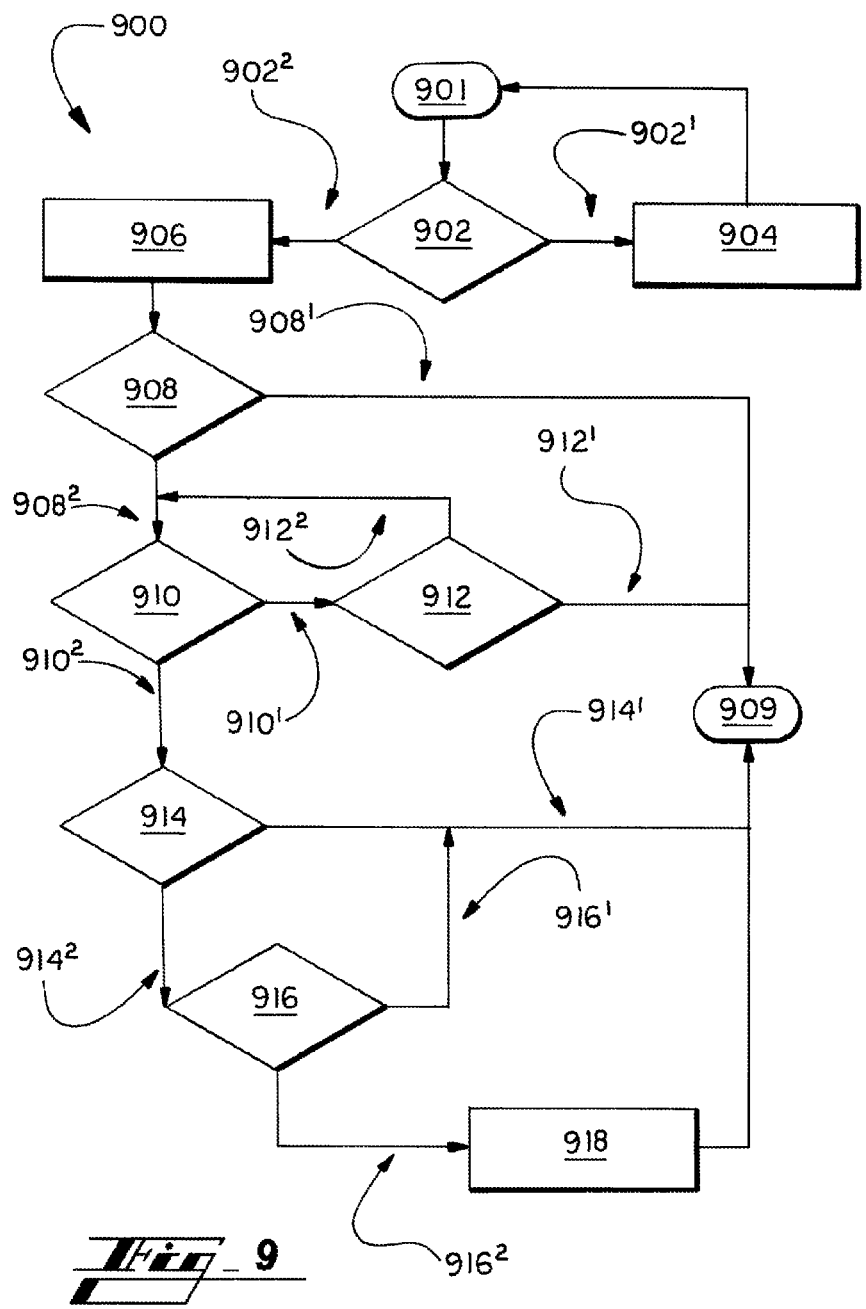

THREE-BODY VEHICLE-BASED OBJECT TRACKING AND NOTIFICATION SYSTEMS

TECHNICAL FIELD

The present disclosure relates generally to systems for monitoring presence of an object and, more particularly, to apparatus for determining whether the object is present and alerting a user when the object may be misplaced.

BACKGROUND

This section provides background information related to the present disclosure which is not necessarily prior art.

There are numerous techniques for monitoring presence of an object using a two-body arrangement. A smart phone or other monitoring device can be programmed to communicate by radio or wireless communication protocol with a monitored mobile device, for instance. The monitored device can be a child bracelet and the monitoring device communicates with the bracelet and provides an alert when the bracelet moves out of range. A parent could use the arrangement to keep track of their child at a grocery store or amusement park using such a system.

There are numerous shortcomings to such two-body arrangements. A first shortcoming for most or all conventional arrangements is that both devices must be proximate each other in the first place. Initial connection is required for most or all conventional devices, and so the monitoring device would not generate an alert indicating that an already distant device, not first sensed in range, is not proximate. Rather, the conventional arrangements require that the devices be proximate and in initial communication with each other, and an alert is provided when the link is broken.

As another shortcoming, if the user leaves the monitoring and monitored devices in the same place, the user would not receive a notification that they are leaving a space without the monitored device.

SUMMARY

In present technology solves the stated shortcomings and others in various embodiments.

in various aspects, the system is implemented at a user structure, to monitor a tracked object using a three-body arrangement including the user, a tracked object, and a controlling apparatus. The system has a data storage device including user-presence module code causing a processor to determine, based on wireless sensing, whether the user has entered a first space having a boundary external to the user structure, or has left the space. Object-presence module code causes the processor to determine, based on tracked-object-presence data, whether the tracked object is within a second space. And the storage device includes alert-module code to, in response to determining that, depending on the embodiment, (i) the user entered or exited the first space and (ii) the tracked object is or is not present within the second space, initiate provision of a system-user alert communication to indicate that the tracked object is not present within the second sensed space.

In a first group of embodiments, the technology includes systems and processes for determining whether a user is apparently about to drive away from a location at which they left a tracked object unintentionally. The system includes a control system at the vehicle configured to determine presence of the user, such as by way of sensing presence of a carried keyfob or worn wearable device. In contemplated implementations, user presence is determined using output from one or more vehicle sensors, such as a weight, motion, heat, or biometric sensor. The vehicle is also configured to determine that the object is apparently not present. The determination can be based on vehicle-sensor feedback and, in various embodiments, communication with a wireless monitored device—e.g., tag—being connected to, or part of, the tracked object.

In another group of embodiments, the technology includes systems and processes for determining whether the user is apparently leaving an object unintentionally in the vehicle while departing or moving away from the vehicle. The system includes the vehicle control system configured to determine that the user is leaving or has left a sensed space associated with the vehicle, such as by using a keyfob or user-detecting sensor. The vehicle is also configured to monitor presence of the object, which again can be accomplished using vehicle-sensor feedback or a wireless monitored device—e.g., tag—associated with the object.

In various implementations, example objects include, a user mobile communication device, a medicine container, a badge, pass, or identification, a pet, a child or other person, a satchel, briefcase, other user container, a keyfob, etc.

Other aspects of the present technology will be in part apparent and in part pointed out hereinafter.

DESCRIPTION OF THE DRAWINGS

FIG. 8 shows an exemplary algorithm by way of a process flow for implementing the arrangement of FIGS. 1-5.

FIG. 9 shows an exemplary algorithm by way of a process flow for implementing the arrangement of FIGS. 2, 3, 6, and 7.

Figure 1:
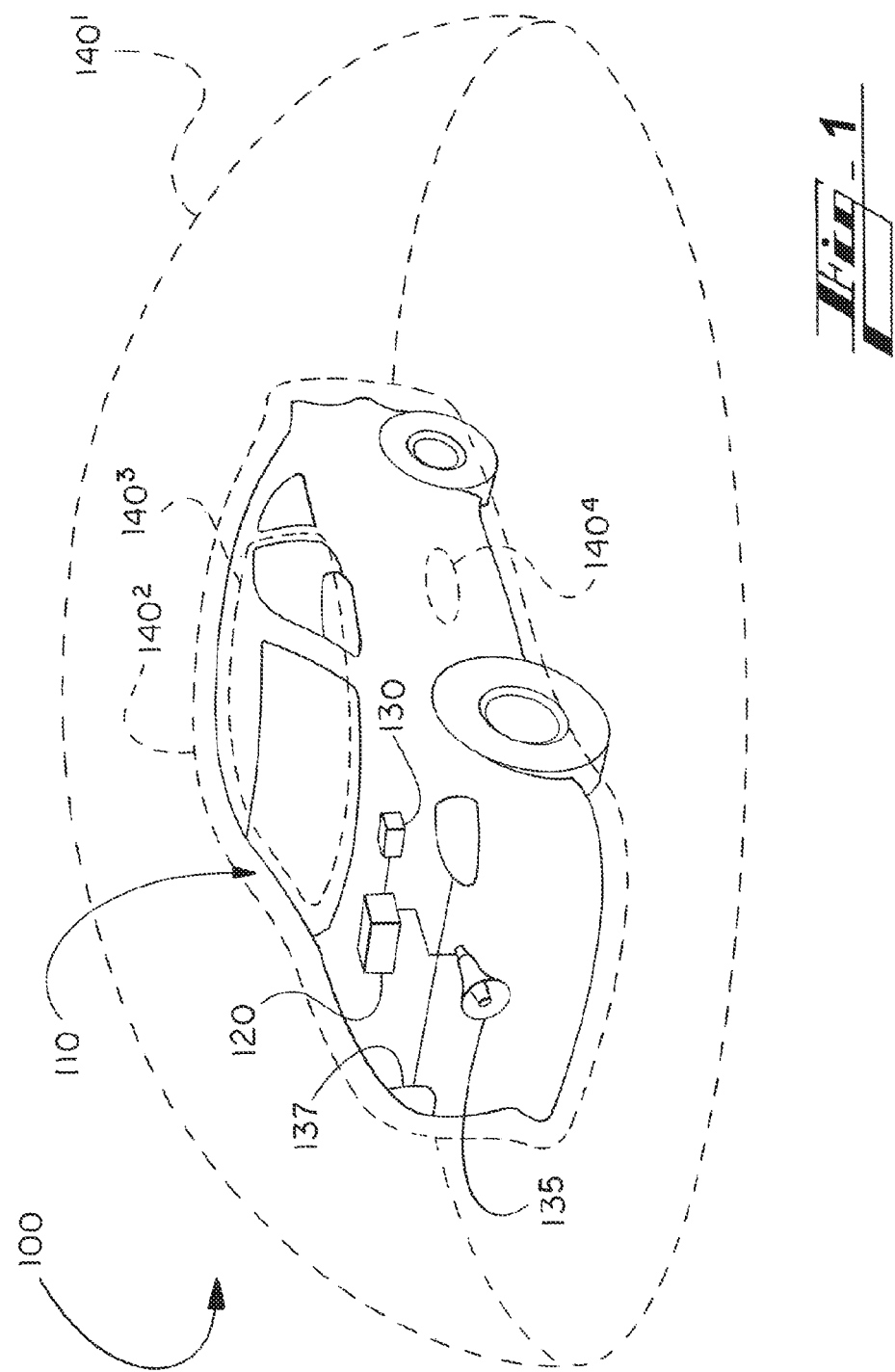
FIG. 1 illustrates a first example environment, including select vehicle components, according to various embodiments of the present technology.

The figures are not necessarily to scale and some features may be exaggerated or minimized, such as to show details of particular components.

DETAILED DESCRIPTION

I. Introduction

The present disclosure describes by various embodiments systems and methods for determining whether a user has left an object in a place, such as the user's home or vehicle, unintentionally. The process is performed based on a three-body arrangement for monitoring presence of the object and the user.

The user is tracked in any of a variety of ways. In various implementations, the user is tracked by a vehicle transceiver sensing or communicating with a mobile wireless device, such as a user-carried keyfob or wearable device. In a contemplated embodiment, user presence is determined based on output of one or more vehicle sensors, such as a weight, motion, heat, or biometric sensor.

The tracked object can also be monitored in any of a variety of ways, such as by a vehicle transceiver sensing or communicating with a wireless device being part of or connected to the tracked object. In a contemplated embodiment, object presence is determined based on output of one or more vehicle sensors, such as a weight, motion, heat, or biometric sensor. A sensor(s), such as a passenger- or back-seat weight sensor, could provide feedback indicating whether a user's child is in the back seat, for example.

In various implementations, example objects include, a user mobile communication device, a medicine container, a badge, pass, or identification, a pet, a child or other person, a satchel, briefcase, other user container, a keyfob, etc.

The applicable location or place mentioned, where the user could leave the object unintentionally, could be, but is not limited to being, a user automobile or other vehicle. The subject place can be a home of the user, an office of the user, or other structure or location visited by the user. Generally, the place should be fitted, retrofitted, or associated with sensors or sensing devices to determine presence, or lack of presence, of one or both of the tracked object and the user.

The structure (e.g., vehicle, office building) can be referred to as a user structure. In various embodiments, the user can at times be positioned within the structure, such as the user entering the building or sitting in the vehicle.

In various embodiments, a user account or profile is established, and can be shared between, or otherwise, used at more than one structure (e.g., user vehicle and user office building, or two user vehicles, etc.). The profile could be stored at the vehicles and/or a remote location, such as a remote server, customer-service, or control center, (ON-STAR is a registered trademark of the Onstar, LLC of Detroit, Mich.).

The user profile could, in addition to being loaded at a primary structure or structures (e.g., user's vehicle and office building (e.g., office garage)), be provided for download at appropriately equipped structures, such as a spouse's car, a rental car, a hotel, a relative's home, a vacation home, etc. In a contemplated embodiment, the profile can be transferred by wire or wirelessly, to a second structure from a mobile storage device, such as a flash drive, smartphone, etc. The user profile, or account includes an identifier for each of one or more subject tracked objects, and any other parameter or setting—e.g., exception(s), alert-type defaults or preferences, etc.

Thus, while the present technology is described primarily herein in connection with automobiles, the technology is not limited by the focus. The concepts can be extended to a wide variety of applications, such as aircraft, marine craft, other vehicles, homes, other buildings or locations, the like, and other.

II. FIG. 1—First Example Environment for Implementation

Turning now to the figures and more particularly the first figure, FIG. 1 illustrates a first example environment 100 in which select invention components are shown.

The environment 100 includes a primary location 110 being, by non-limiting example, a vehicle in the environment 100 of FIG. 1. Other example locations 110 include a house, office building, or other structures or spaces or areas having structure on which the component(s) described herein could be positioned.

The vehicle 110 includes a hardware-based computer controller, or controlling apparatus 120. The controlling apparatus 120 includes or is in communication with at least one sensing and communication device 130 and at least one output, or user notification device 135, 137. The example output devices shown schematically are a vehicle horn 135 and lighting system 137, representing any vehicle lights—e.g., front, rear, lateral, under-side, or interior.

Without limiting a type of the sensing and communication device 130 may be, it is referred to primarily herein as a sensing device 130.

Figure 2:
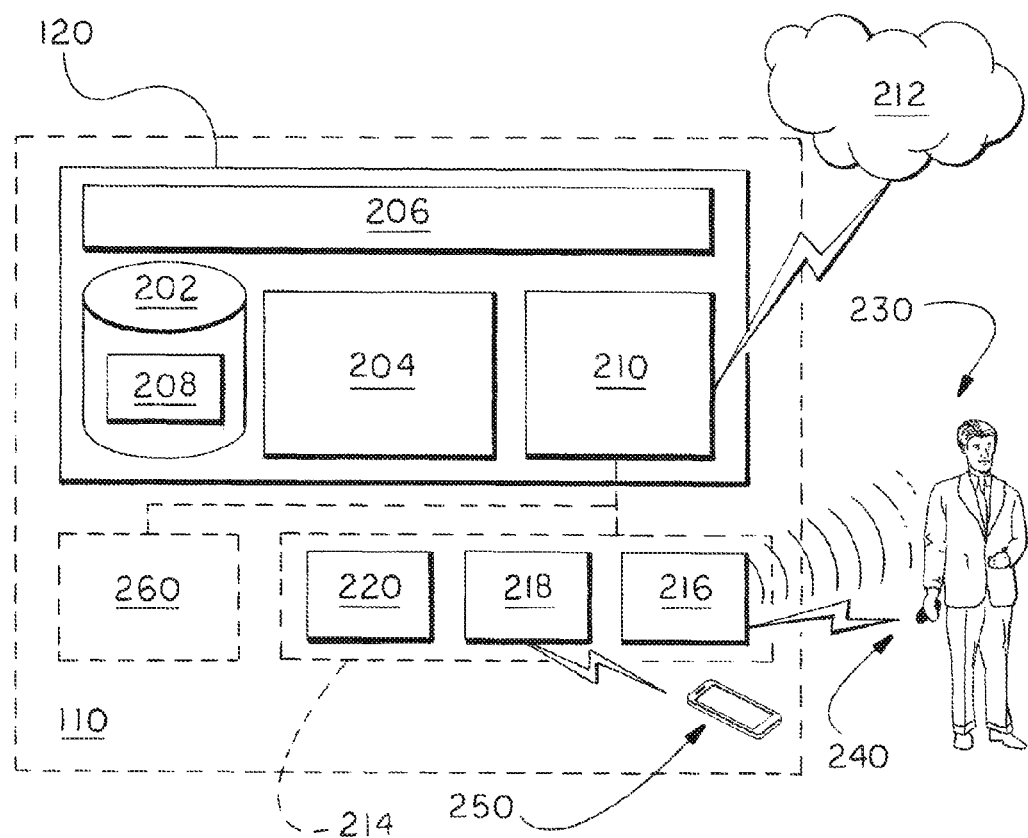
FIG. 2 illustrates schematically a computer architecture according to various embodiments of the present technology.
Figure 4:
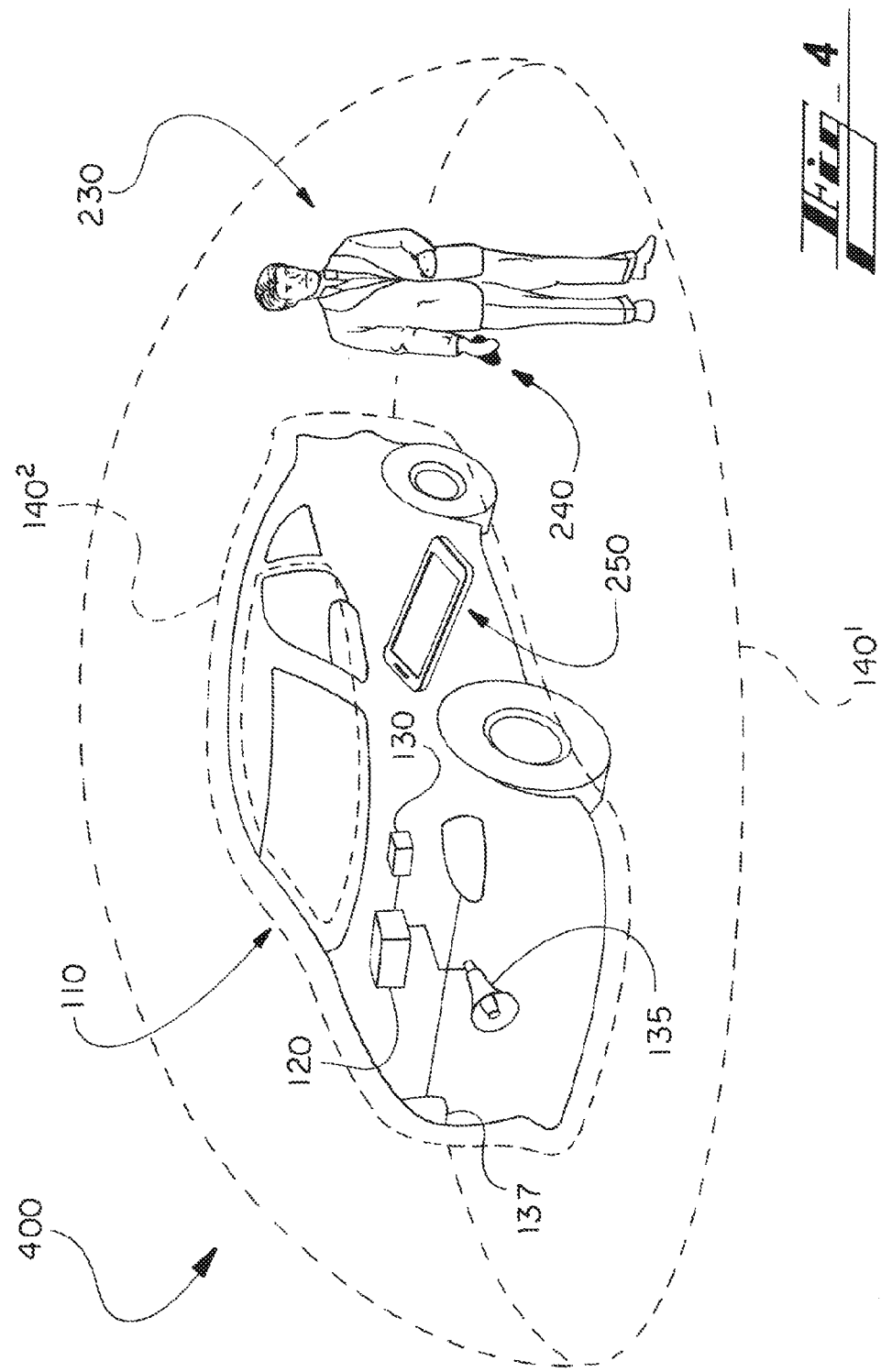
FIG. 4 shows the environment and components of FIG. 1 along with a tracked object and a user.

The at least one sensing device 130 is, in various embodiments, used to determine presence or absence of one or both of a tracked object and the user, which are introduced in FIGS. 2 and 4.

The controlling apparatus 120 can be connected to the sensing device(s) 130 by wire or in communication by wireless-communication structures. The sensing device 130 can include, for instance, a short-range or near-field-communications transceiver, such as a short-range RADAR device or transceiver configured to communicate by way of the Bluetooth® protocol, or another wireless communication protocol. (BLUETOOTH is a registered trademark of Bluetooth SIG, Inc., of Bellevue, Wash.).

In a contemplated embodiment, the sensing device 130 includes a radio-frequency identification (RFID) reader. The RFID reader produces radio waves. In some embodiments the reader, or an accompanying device, produces a magnetic field for powering an RFID tag to be read by the reader. In various embodiments, any of the user devices (such as indicated by reference numeral 240 in FIG. 2), a user-worn wearable, and the tracked object includes or is connected to a respective RFID tag.

Passive tags, such as but not limited to passive RFID tags, have benefits including being monitored even if a base device to which the tag is connected is not powered, such as by being out of battery or just turned off at the time. For instance, if a passive RFID tag were part of or attached to a phone, a suitable sensor/communicator (such as indicated by reference numeral 218 in FIG. 2)—e.g., passive RFID reader—could determine whether the phone is within range of the sensor/communicator whether the phone was turned on.

Or if a passive RFID tag were part of or attached to user-carried or user-worn device (reference numeral 240 in FIG. 2), a suitable user sensing or communicating device (reference numeral 216 in FIG. 2)—e.g., passive RFID reader—could determine accurately whether the user-carried or user-worn device (240) (which can be used as a proxy for user presence) is within range of the object sensing or communicating device (reference numeral 218 in FIG. 2) whether the user-carried or user-worn device (240) was turned on.

The sensing device 130 is associated with a sensed space 140. The sensed space 140 can be referred to by a variety of terms such as geo-fence, range, sensed area, sensed range, sensed space, sensed boundary, just boundary, or the like. The space is not always created by a wireless scanning or communication range, such as Bluetooth or RFID. The space can correspond, for instance, to a driver seat where the sensing device is a seat weight sensor, or a steering wheel sensor. These are example sensing or communicating devices that can be used to confirm presence of a person in a general space, such as in a driver's seat space $140^4$.

For embodiments in which the sensing device 130 comprises a short-range or near-field communication device, the sensing space 140 can correspond to a range of the device 130.

Items that can be sensed by the sensing device 130 include the user, a device associated with the user, and the tracked object (reference 240, 230, and 250 in FIG. 2, respectively). Example user-associated devices (240) include a keyfob carried by the user, or a wearable device, capable or wireless communications. Example tracked objects (250) include a user mobile communication device, such as a phone or tablet computer, or a device connected to the communication device. Another example tracked-object-associated devices include a mobile monitor or wearable held by, connected to, or worn by the tracked object, such as a pet collar or implant, or a child bracelet, anklet, shoes, watch, ring, necklace, pendant, broach, earring, or keychain.

Referring further to FIG. 1, a first example sensed space 140 is a short-range or near-field-communications wireless communication geo-fence 140$^1$ defined by a form of sensing device 130 configured to sense or communicated with a tracked object (250 in FIG. 2) positioned within the sensed space 140$^1$.

In another embodiment, the sensing device 130 is configured to sense a space 140$^2$ corresponding generally to a boundary of a subject location, being the vehicle 110 in the primary example.

In still another embodiment, the sensing device 130 is configured to sense a space 140$^3$ corresponding generally to a portion of the location, such as a front-passenger compartment, or driver section, of the vehicle 110.

In yet another embodiment, the sensing device 130 is configured to sense a space 140$^4$ corresponding generally to a smaller, sub portion of the location, such as a driver space of the vehicle 110. The sensing device 130 can be configured to sense whether the user is seated in the vehicle 110, for instance. Example sensors include a driver-seat weight sensor, a motion detector (RADAR, camera), heat sensor, a biometric sensor, such as a steering wheel sensor, or other person-detecting technology.

In various embodiments, a sensing device (for the user sensing device, the object sensing device, or both) includes any one or more of the aforementioned and a capacitive-displacement sensor, a doppler-effect sensor, an eddy-current sensor, an inductive sensor, a laser rangefinder, a magnetic sensor (e.g., magnetic proximity fuse sensor), a passive-optical sensor (such as charge-coupled device), a passive thermal infrared sensor, a photocell (e.g., reflective), a reflection of ionizing radiation type sensor, a sonar type sensor (e.g., active or passive), an ultrasonic sensor (sonar which runs in air), a fiber optics sensor, a hall effect sensor, and any presence, motion, and proximity detection device.

Figure 3:
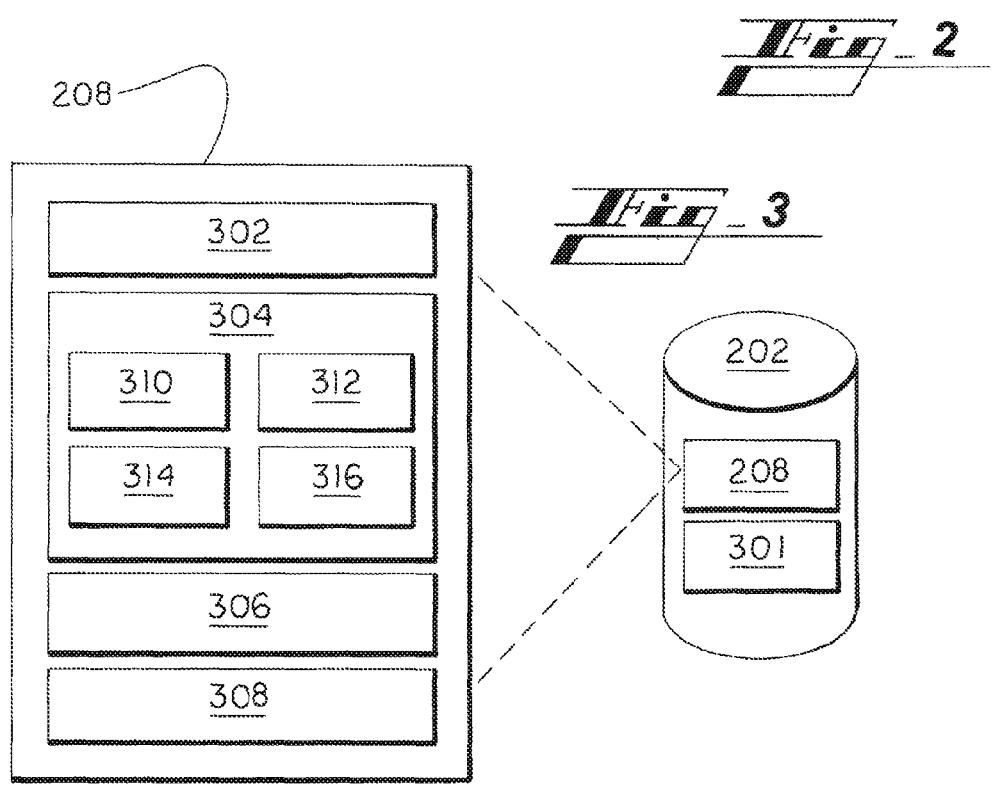
FIG. 3 shows example memory components of the computer architecture of FIG. 2.

III. FIGS. 2 and 3—Example Computing Architecture

FIG. 2 illustrates schematically an example architecture for the hardware-based controlling apparatus 120 of FIG. 1, comprising a data storage device 202, according to various embodiments of the present technology.

FIG. 3 shows in more detail components of the data storage device 202 of FIG. 2.

While the hardware-based controlling apparatus 120 is described primarily in connection with being the computing controller of the primary location 110—e.g., an automobile or other vehicle—other computing systems that can be associated with the technology in various embodiments, such as that of a user mobile phone, another tracked object, or a remote customer service center or server, can have the same or similar architecture. While most embodiments are described in the contact of the vehicle performing primary processing functions, various functions, including setting up or altering a user account, can be performed using another controlling apparatus, such as a user mobile communication device having a specially configured application corresponding to the present technology. In the vehicle context, the controlling apparatus 120 can be, or can be part of or connected to, an on-board computer (OBC), an electronic control unit (ECU), or other primary computing unit of the vehicle 110.

As mentioned, in various embodiments, a user account or profile is established, and can be shared between, or otherwise, used at more than one structure (e.g., user vehicle and user office building, or two user vehicles, etc.). The profile could be stored at the vehicles and/or a remote location, such as a remote server, customer-service, or control center, such as of the OnStar® control center. The user profile could, in addition to being loaded at a primary structure or structures (e.g., user's vehicle and office building (e.g., office garage)), be downloaded to appropriately equipped structures, such as a spouse's car, a rental car, a hotel, relative's home, vacation home, etc. In a contemplated embodiment, the profile can be transferred by wire or wirelessly, to a second structure from a mobile storage device, such as a flash drive, smartphone, etc. The user profile, or account includes an identifier for each of one or more subject tracked objects, and any of the other parameters or settings (e.g., exception(s), alert-type defaults or preferences, etc.).

The controlling apparatus 120 includes a hardware-based computer-readable storage medium, or data storage device 202. The apparatus 120 further includes a hardware-based processing unit, or processing hardware unit 204, connected or connectable to the data storage device 202 by way of a communication link 206, such as a computer bus or wireless structures.

The processing hardware unit 204 can include or be multiple processors, which could include distributed processors or parallel processors in a single machine or multiple machines. The processing hardware unit can be used in supporting a virtual processing environment. The processing hardware unit could include a state machine, application specific integrated circuit (ASIC), programmable gate array (PGA) including a Field PGA, or state machine. References herein to the processing hardware unit executing code or instructions to perform operations, acts, tasks, functions, steps, or the like, could include the processing hardware unit performing the operations directly and/or facilitating, directing, or cooperating with another device or component to perform the operations.

In various embodiments, the data storage device 202 is any of a volatile medium, a non-volatile medium, a removable medium, and a non-removable medium.

The term computer-readable media and variants thereof, as used in the specification and claims, refer to tangible storage media. The media can be a device, and can be non-transitory.

In some embodiments, the storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The data storage device 202 includes one or more storage modules 208 storing computer-readable code or instructions executable by the processing hardware unit 204 to perform the functions of the hardware-based controlling apparatus 120 described herein. The modules and functions are described further below in connection with FIGS. 3-9.

In various embodiments, the data storage device 202 includes a plurality of modules 208. The data storage device 202 in some embodiments also includes ancillary or supporting components 301, shown in FIG. 3. The ancillary or supporting components 301 can include, for instance, additional software and/or data supporting performance of the processes of the present disclosure, such as one or more user profiles or a group of default and/or user-set preferences.

With further reference to FIG. 2, the hardware-based controlling apparatus 120 also includes a communication sub-system 210 for communicating with internal, local and/or external—nearby or remote—devices. The communication sub-system 210 can include any of a wire-based input/output (i/o), at least one long-range wireless transceiver, and at least one short-range or near-field-communications wireless transceiver. The communication and sensing device 130 can, in various embodiments, include, use, or be a part of any of the components of the communication sub-system 210.

By short- and/or long-range wireless communications, the controlling apparatus 120 can, via the communication sub-system 210 and the processor 204, send and receive information, such as in the form of messages or packetized data, to and from one or more communication networks 212, such as the Internet.

The vehicle 110 also includes a sensor sub-system 214 comprising sensors providing information to the hardware-based controlling apparatus 120. The sensor sub-system 214 can include the sensing device(s) 130 referenced above with respect to FIG. 1. The sensor sub-system 214 can, in various embodiments, include, use, or be a part of any of the components of the communication sub-system 210.

The sensors of the sub-system 214 can provide feedback regarding a variety of sensed characteristics regarding the user or other people or objects, including presence or identification of the person or object.

Though any arrangement of sensor or feedback device(s) described herein can be used to sense a user, an object, and/or other characteristics of the environment 100 (FIG. 1), the sensor subsystem 214 is shown by way of example divided into user-sensing device(s) 216, object-sensing device(s) 218, and vehicle sensors 220.

While the user-sensing device(s) 216 and object-sensing device(s) 218 are shown separately, they may include or share common structure. Any sensing device or devices of the groups 216, 218 can be configured and used to sense both the user(s) and tracked object(s), for example. For implementations in which this is the case, the sensing device(s) can be said to be a part of both groups 216, 218, or the two groups considered one. Any sensor or feedback device of the first two groups 216, 218 can be part of the third group 220, or vice versa. And any sensor or feedback device of the three groups 216, 218, 220 can be a part of, include, or use one or more components of the communication sub-system 210. For example, a driver-seat weight sensor can be a vehicle sensor 220 and used to detect the user as a user-sensing device 216.

FIG. 2 shows the user-sensing device 216 sensing, tracking, monitoring, or communicating with a user 230 or user associated device 240. The interaction is in various embodiments affected in various ways. The user-sensing device 216 can communicate wirelessly with the user device 240 held by, worn by, or otherwise associated with the user 230. An example user device 240 is a keyfob, as shown in FIG. 2.

In various embodiments, the user-sensing device 216 can also implement biometric sensing, camera-based sensing, receiving a user-provided code, the like, or other. Example biometric sensing include gait sensing, or walk-pattern sensing.

While the user-sensing device 216, and technology generally, are described primarily in connection with the user 230 being a driver of a vehicle 110, the technology can be used in connection with other individuals, instead of or in addition to being used in connection with the driver. A spouse of a first user can have an account stored in the vehicle system—e.g., stored in the storage device 202—and the arrangement can notify the spouse if the spouse left a phone in the vehicle (embodiments of FIGS. 4, 5, and 8) or at a location such as a house (embodiment of FIGS. 6, 7, and 9).

In other embodiments, the user-sensing device 216 is configured to sense presence or absence of the driver without communicating with a user-carried or user-worn device 240. For instance, as mentioned, the user-sensing device 216 can include a camera, a driver-seat-based weight sensor, or a motion, heat, biometric sensor, or receiving a user-provided code. The user-sensing device 216 is in various implementations configured and arranged to sense the user 230 when the user is in or near the vehicle 110, when the user is outside of the vehicle 110, and in some cases configured and arranged to sense the user 230 whether the user is inside or outside of the vehicle 110.

FIG. 2 also shows the object-sensing device(s) 218 sensing, tracking, monitoring, or communicating with the tracked object 250, such as a user phone, tablet computer, or keyfob. The interaction can be affected in various ways. The object-sensing device 218 can communicate with the object 250 wirelessly, such as by Bluetooth or other short-range or near-field communication protocol. While the interaction between the object-sensing device 218 and the object 250 is shown as a wireless communication, by bolt symbol in FIG. 2, the interaction is not limited to wireless communications.

Regarding the embodiments in which a keyfob is the tracked object 250, then, the vehicle 110 is configured (suitable sensing or communicating device 130, etc.) to determine presence, or lack of presence, of the user 230 in ways other than tracking presence of the keyfob. Other manners include those mentioned, such as by way of a seat, heat, or biometric sensor, receiving a user-provided code, camera, RADAR, or short-range or near-field communication between the vehicle 110 and some other wireless user device 240 held or worn by the user 230.

Example sensing devices 130 are described above.

In other embodiments, the object-sensing device 218 is configured to sense presence or absence of the tracked object 250 without communicating wirelessly with the object 250. For instance, as referenced, the object-sensing device 218 can include a camera, a passenger- or rear-seat-based weight sensor, or a motion, heat, or biometric sensor. The object-sensing device 218 is in various implementations configured and arranged to sense the object 250 when the object is in or near the vehicle 110, when the object is outside of the vehicle 110, and in some cases configured and arranged to sense the object whether the object is inside or outside of the vehicle 110.

The arrangement can be configured so that the hardware-based controlling apparatus 120 communicates with, or at least receives signals from sensors of the sensor sub-system 214, via wired or short-range wireless communication channels.

The sensor sub-system 214 can include unchanged or modified versions of any conventional vehicle sensors 220, such as those providing feedback about vehicle operations, vehicle position, vehicle pose, and/or the environment about the vehicle 110. In some embodiments, the vehicle sensors 220 include at least one external-phasing camera and at least one range sensor, such as RADAR. The camera may include a monocular forward-looking camera, such as those used in lane-departure-warning (LDW) systems.

The vehicle sensors 220 can be used to sense people or objects according to the present technology. A vehicle camera or RADAR sensor can be used to track or identify the user 230, for instance.

Such sensor sensing external conditions may be oriented in any of a variety of directions without departing from the scope of the present disclosure. For example, cameras and RADAR devices may be oriented at each, or a select, position of, for example, (i) facing forward from a front center point of the vehicle 110, (ii) facing rearward from a rear center point of the vehicle 110, (iii) facing laterally of the vehicle from a side position of the vehicle 110, (iv) between these directions, and each at or toward any elevation, and (v) from and to any direction internal to the vehicle 110.

A range sensor may include a short-range RADAR (SRR), an ultrasonic sensor, a long-range RADAR, such as those used in autonomous or adaptive-cruise-control (ACC) systems, or a Light Detection and Ranging (LiDAR) sensor, for example. Other sensor sub-systems include an inertial-momentum unit (IMU), such as one having one or more accelerometers, and/or other such dynamic vehicle sensors, such as a wheel sensor or a sensor associated with a steering system (e.g., steering wheel) of the vehicle 110.

A long-range transceiver is in some embodiments configured to facilitate communications between the hardware-based controlling apparatus 120 and a satellite and/or a cellular telecommunications network, which can be considered also indicated schematically by reference numeral 212.

A short-range transceiver can be configured to facilitate short-range communications, such as communications with other vehicles, in vehicle-to-vehicle (V2V) communications, and communications with transportation system infrastructure (V2I). To communicate V2V, V2I, or with other extra-vehicle devices, such as local communication routers, etc., the short-range communication transceiver may be configured to communicate by way of one or more short-range communication protocols. Example protocols include Dedicated Short-Range Communications (DSRC), Wi-Fi®, Bluetooth®, infrared, infrared data association (IRDA), near field communications (NFC), the like, or improvements thereof (WI-FI is a registered trademark of WI-FI Alliance, of Austin, Tex.).

The extra-vehicle, or external, devices to which the hardware-based controlling apparatus 120 can communicate, in execution of the functions of the present technology, can include a remote data, customer-service, and/or control center, which can be considered shown by, or reachable by, the network indicated by numeral 212. An example control center is the OnStar® control center, having facilities for interacting with vehicles and users, whether via the vehicle or otherwise (e.g., mobile phone) via long-range communications, such as satellite or cellular communications.

The vehicle 110 further includes multiple input and/or output devices 260. Example output devices include a vehicle horn, speaker system, display, and lights, internal and external. The display (reference numeral 602 in FIGS. 6 and 7) can be of any type and location, such as a dashboard screen, an instruments panel display, and a heads-up display (HUD). Example input devices include a touch-sensitive display, a microphone, and wireless or wired-port connections, such as for communicating with a user device such as a phone or tablet computer. Some output devices also function as input devices. An example is a touch-sensitive display.

The controlling apparatus 120 is connected to the input and output devices, and configured to deliver signals to selectively actuate the output devices. In various embodiments, the hardware-based controlling apparatus 120 is configured to receive and process user inputs for setting up or modifying a program, stored at the storage device 202, for performing processes of the present technology. The program can include a user account associated with the user. The tracked object is associated with, or paired with, the account. The controlling apparatus 120 can thus be programmed to receive user input regarding creating the one or more user accounts, and associating one or more objects with each account. These functions can be performed by processing hardware unit 204 executing code of a setup module of the storage device 202, to be described further below with reference to numeral 302 and FIG. 3.

As provided, in various embodiments, a user account or profile is established, and can be shared between, or otherwise used at, more than one structure—e.g., user vehicle and user office building, or two user vehicles, etc. The profile could be stored at the vehicles and/or a remote location, such as a remote server, customer-service, or control center, such as of the OnStar® control center. The user profile could, in addition to being loaded at a primary structure or structures (e.g., user's vehicle and office building (e.g., office garage)), be downloaded to appropriately equipped structures, such as a spouse's car, a rental car, a hotel, relative's home, vacation home, etc. In a contemplated embodiment, the profile can be transferred by wire or wirelessly, to a second structure from a mobile storage device, such as a flash drive, smartphone, etc. The user profile, or account includes an identifier for each of one or more subject tracked objects, and any of the other parameters or settings (e.g., exception(s), alert-type defaults or preferences, etc.).

The functions can further include pairing, or mating, each account to one or more objects, one or more user devices (e.g., keyfobs), and one or more users.

The controlling apparatus 120 can be configured to perform the pairing, or mating, in any suitable manner. The configuration can include the apparatus 120 arranging a handshake operation by which the apparatus 120 recognizes the object, user device, or user, such as by storing an address, identifier, or other characteristic of the object, user device, or user. Regarding the user, for instance, the characteristics associated in the apparatus 120 with the user can include a user weight, voice, retina or other eye features, height, walking gait, the like or other.

In contemplated embodiments, the hardware-based controlling apparatus 120 is configured to receive instructions from a remote device, such as a user mobile computing device, laptop, tablet, or desktop computer at which the user makes selections for establishing or modifying the user account. In another contemplated embodiment, the controlling apparatus 120 is configured to receive instructions from a remote computer system or server such as a computer system of a remote customer-service and/or control center, such as the OnStar® control center.

While associations between the user 230 and the tracked object(s) 250 are described primarily herein as being created, updated, and maintained at the vehicle controlling apparatus 120, the associations can be created, updated, and/or maintained in other locations, such as at a user device—e.g., smart phone application, at a user tablet or desktop computer. In various embodiments, even if the user account is established outside of the vehicle 110, the tracked object must still be linked, or paired, to the account at the vehicle 110.

As provided, FIG. 3 shows in more detail the data storage device 202 of FIG. 2. The data storage device 202 includes computer code or instructions arranged in one or more modules 208.

The data storage device 202 may also include ancillary components 301, such as additional software and/or data supporting performance of the processes of the present disclosure. The ancillary components 301 can include, for example, user profiles or settings. The system can be programmed to include any convenient or useful settings for operation of the technology.

As just one example, the storage device 202 can include an exception module comprising code, provided in response to user request or default or updated setting, for instance, indicating at home, or another pre-identified location and being configured to (1) recognize when the user 230 is at the pre-established location, or one of multiple pre-established locations, and (2) not alert the user based on the recognition (1). For instance, controlling apparatus 120 may be configured so that, when the user 230 is at home, the apparatus 120 does not initiate an alert to advise the user that they left the sensed space 140 (e.g., vehicle) without the tracked object 250.

Further regarding the exception module, in some embodiments, the non-alert (2) includes or results from an affirmative decision at the system to not send the alert because of the recognition (1). The decision can be provided in any of multiple potential locations of an underlying algorithm, such as before the alert would otherwise be provided—an example exception module step is provided as such by flow-chart diamond 816 in the algorithm 800 FIG. 8, and 916 in the algorithm 900 of FIG. 9.

In contemplated embodiments relating to the exception module, the alert is not generated or sent because the code causes the system to, in response to the recognition (1), enter an exception mode whereby the system does not determine whether the system does not track the object. As with all components, modules, functions, and the like, herein, the exception mode can be referred to by other terms, such as a non-alert mode, a non-tracking mode, similar, or other.

These and other data components are described elsewhere, herein, including below in connection with the processes 800, 900 of operation shown in FIGS. 8 and 9.

The modules 208 in various embodiments include at least three (3) modules 302, 304, 306.

FIG. 3 shows an additional module by reference numeral 308 to indicate that the controller 120 can include one or more additional modules. The supporting module(s) 308 can include, for example, a user-account module and/or a passenger- or second-user-account module.

As mentioned above, in various embodiments, a user account or profile is established, and can be shared between, or otherwise, used at more than one structure (e.g., user vehicle and user office building, or two user vehicles, etc.).

Any of the code or instructions described can be part of more than one module. And any functions described herein can be performed by execution of instructions in one or more of the modules, though the functions may be described primarily in connection with one module by way of primary example.

Each of the modules 208 can be referred to by any of a variety of names, such as by a term or phrase indicative of its function. The modules 302, 304, 306 of the controller 120 can be referred to as a setup module 302, a presence or proximity module 304, and an alert or notification module 306, or similar, for example.

The setup module 302 is configured in various embodiments to perform any suitable administrative function. Example functions include initiating or performing transmission of a tracked-object user profile to another device. For embodiments in which the memory 202 is part of a flash drive, or mobile phone, for instance, the setup module 302 can be used to send the tracked-object user profile to a computing controller of a structure associated with the user, such as a rental car, home, office, hotel or hotel room, second or other car of the user's family, the like or other. Functions related to sending or transferring the profile to other devices is described further below.

Any of the modules 208 can include sub-modules, such as shown by reference numerals 310, 312, 314, 316 in connection with the second illustrated module 304 of FIG. 3. Sub-modules can perform specific operations or routines of module functions.

Like the modules 302, 304, 306, 308, each of the sub-modules can be referred to by any of a variety of names, such as by a term or phrase indicative of its function. The sub-modules can be referred to, for example, as a triggering-event sub-module 310, a user-presence determination sub-module 312, a tracked-object presence determination sub-module 314, and an alert-initiation sub-module 316.

The modules and their functions are described further below, including in connection with the processes of FIGS. 8 and 9.

Figure 5:
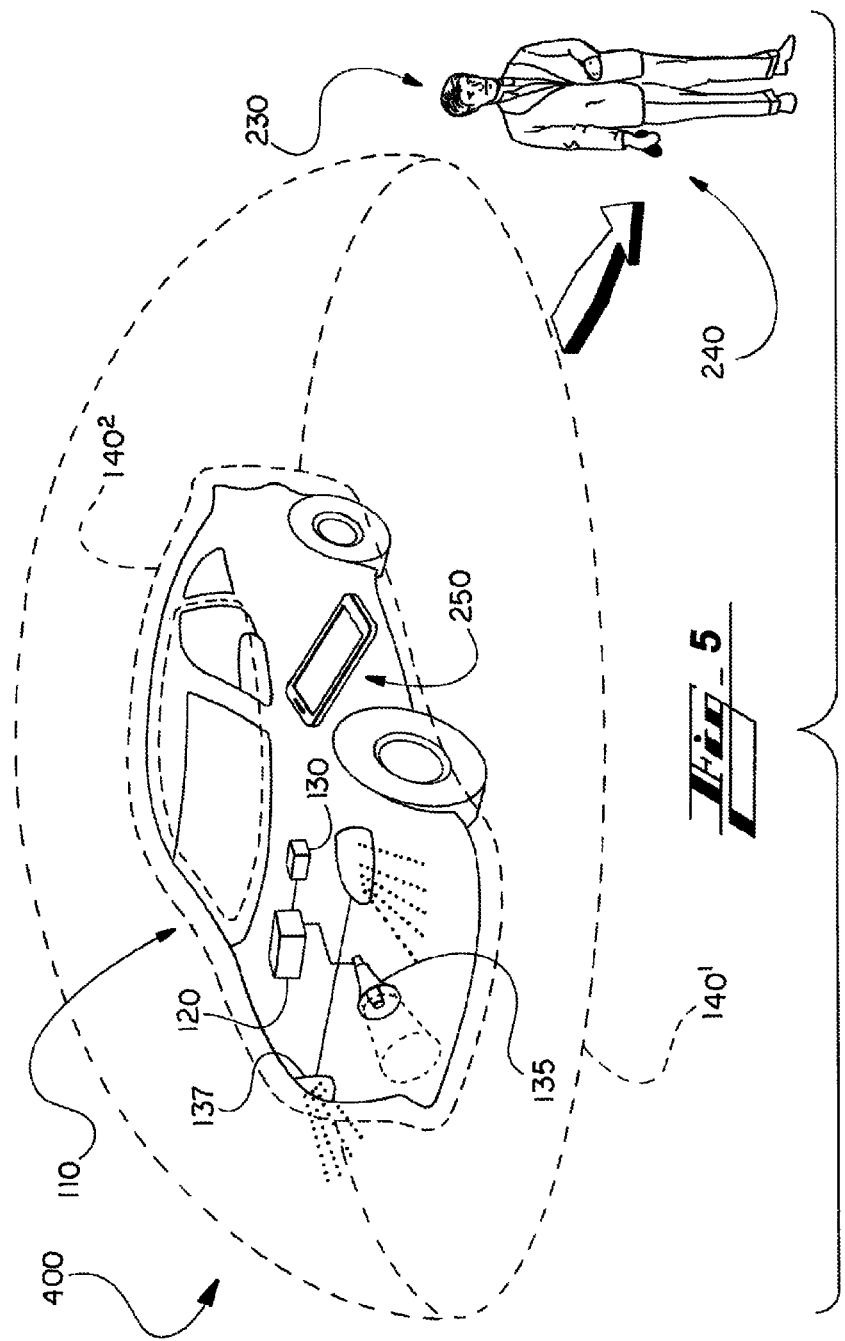
FIG. 5 shows the view of FIG. 4 after the user has moved outside of a boundary established by the vehicle.

IV. FIGS. 4 and 5—First Example Implementation Cont

FIG. 4 shows an environment 400 including the structure of FIG. 1 and the user 230, user device 240, and tracked object 250 of FIG. 2.

The view also illustrates two example sensed spaces $140^1$, $140^2$ of the many possible sensed spaces 140 described above.

As mentioned, presence of the user 230 can be monitored in any one or more of a wide variety of ways, including by RADAR, camera, seat sensor, or short-range or NFC communications between the vehicle 110 and a wireless user device 240 held or worn by the user, such as a keyfob.

Likewise, presence of the tracked object(s) 250 can be monitored in any one or more of a wide variety of ways, including by RADAR, camera, seat sensor, or short-range or NFC communications between the vehicle 110 and the tracked object 250 or a tag or wireless device connected to the tracked object.

In some embodiments, a single sensed space, such as the second example $140^2$ space, can be formed and used to monitor presence of the user 230 (such as via the user device 240) and/or the object 250. In a contemplated embodiment, the sensed space 140 is not created by the vehicle 110. The space 140 could be a sensor in a parking garage, for example.

In an example of FIG. 4, the first sensed space $140^1$ is used to monitor presence of the user 230 and the second sensed space $140^2$ is used to monitor presence of the tracked object 250.

Various factors can contribute to determining applicable monitoring characteristics, such as which type and size of sensed space to use. These characteristics can be set by default and in some embodiments can be altered per preference by the user or others—e.g., dealership, remote customer service center, etc.

A benefit of having a large sensed space 140 for monitoring user presence—e.g., how the first example space $140^1$ is larger than the second space $140^2$—is that the user 230 will not receive alerts in circumstances in which the user is only moving around the vehicle 110, such as to access the trunk or back seat, and has not actually forgotten the tracked object 250.

Using a tighter space for monitoring user presence can have benefits as well. If a sensor specific to the driver seat (e.g., seat sensor, driver-seat-focused camera, driver heat sensor) is used, for example (reference the fourth example space $140^4$ of FIG. 1), the user 230 can be notified immediately after leaving the vehicle 110, very soon after leaving the driver seat, that the tracked object 250 is still in the vehicle 110.

Similarly, if a driver compartment or vehicle-boundary sensed space $140^1$, $140^2$ were used, the user 230 can be notified immediately upon leaving the vehicle 110 that the tracked object 250 is still in the vehicle 110. These arrangements can save time and avoid distracting others, such as when the technology is being used in a school or work environment. Time can be saved because the user 230 will not be so far away when they are notified that they need to return to the vehicle 110 if they need to retrieve the tracked object 250.

As shown in FIG. 4, the user 230 and tracked object 250 are within the respective sensed spaces $140^1$, $140^2$ used to monitor their presence in the primary example being described.

FIG. 5 shows the view of FIG. 4 after the user 230 has moved outside of the user sensed space $140^1$. The user 230 has left the tracked object 250 behind, in the vehicle 110, unintentionally. In response to determining that the tracked object is still in the vehicle, the processing unit 204, executing appropriate code 208 of the data storage device 202, initiates provision of one or more alerts or notifications to advise the user 230 that the tracked object 250 has been left in the vehicle 110.

In the illustrated case of FIG. 5, providing the alert includes actuating output devices such as a vehicle horn 135 and lighting system 137.

The system can be programmed to actuate output devices in any desired manner, and in various embodiments the system is configured to allow customization or preference-setting of such characteristics, including by the user 230. The user 230 could prefer a quieter honk, no honk, blinking lights, continuous light illumination, for instance, and any output can be associated with a default or pre-set period of time. Or any of the output can be provided until a subsequent triggering event, such as the user deactivating the warning, such as by a keyfob being carried by the user, or the tracked object 250 being moved outside of the vehicle 110 or corresponding sensed space 140—e.g., space $140^2$ in the primary example.

In various embodiments, the notification or alert is provided by way of a user device 240, such as a keyfob. The keyfob can be configured in any of many ways to advise the user 230 of an issue, such as by including an actuator for creating a vibration and/or an actuator for providing a sound.

Various notifications, by various mechanisms, can be provided in connection with the same offense, simultaneously, in series, or otherwise. As just one example, the notifications can include first blinking lights, followed by a horn honking, followed by keyfob vibration and beeping, followed by text message. Provision of any of the notifications can overlap.

In various embodiments, the arrangement is configured so that various tracked objects 250 for a user 230 are associated in the system with respective forms of notification. For instance, if the tracked object 250 left behind is an RFID-tagged notebook, the notification can include only the vehicle lights 137 blinking. While, if the tracked object 250 left behind were a user phone, the notification can include blinking the lights 137 and honking the horn 135.

As another example, if the tracked object 250 left behind were an important medicine bottle or child, the notification can include blinking the lights 137, honking the horn 135 repeatedly, and sending a text message, email, and/or automated call. A communication providing an alert can be made via remote systems, such as remote servers, systems or networks of various service providers (ISPs, NSPs, etc.), and customer-service centers such as the OnStar® control center mentioned.

As still another example, if the tracked object 250 were a pet, the vehicle 110 or user device 240 could be configured to provide a pre-selected or corresponding sound, such as a barking sound.

Sounds can include any sound desired, such as various basic tones or specially-recorded (e.g., user-recorded or user obtained) sounds that can be associated with an object 250 in the system.

Structure and operation of the arrangement of FIGS. 1-5 are described further below in connection with FIG. 8.

Figure 6:
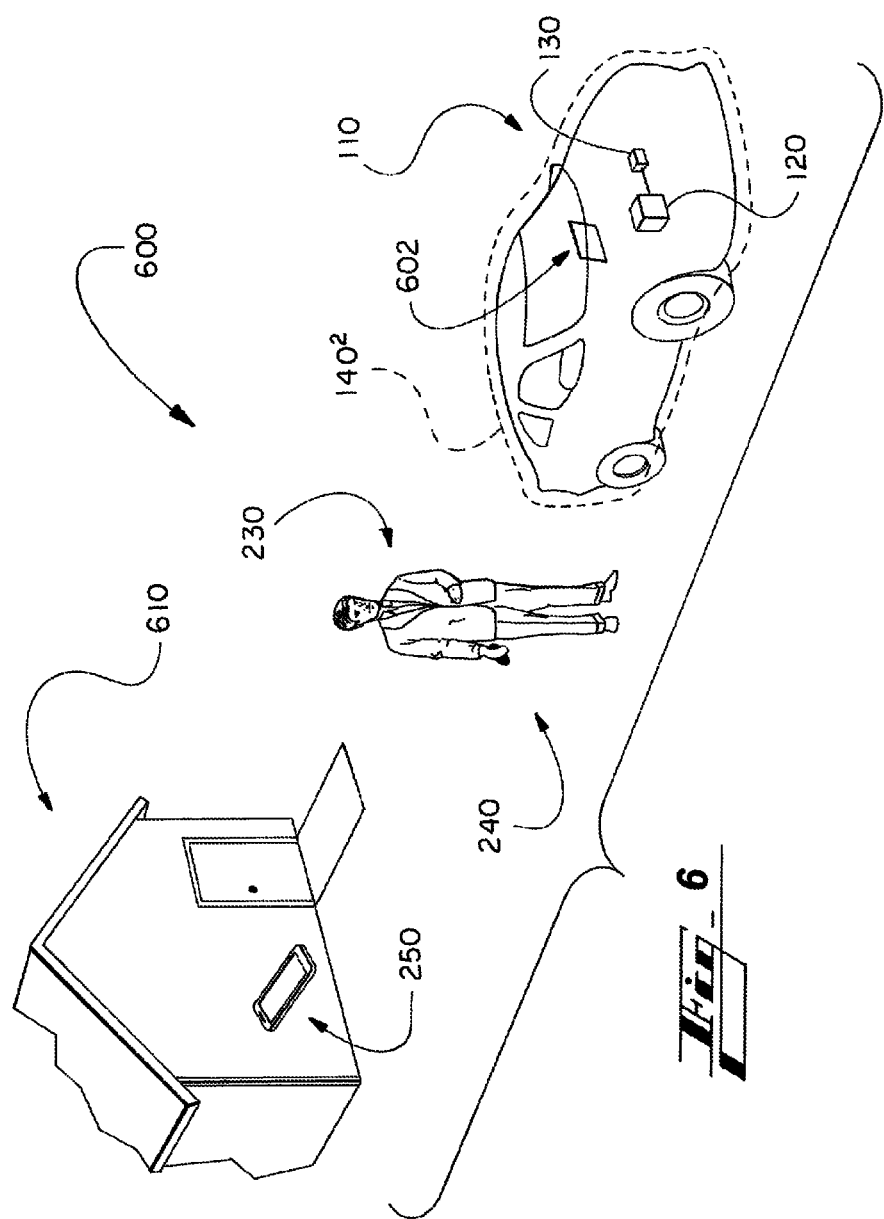
FIG. 6 illustrates a second example environment, including select vehicle components, the tracked object, and a building that the user is leaving.
Figure 7:
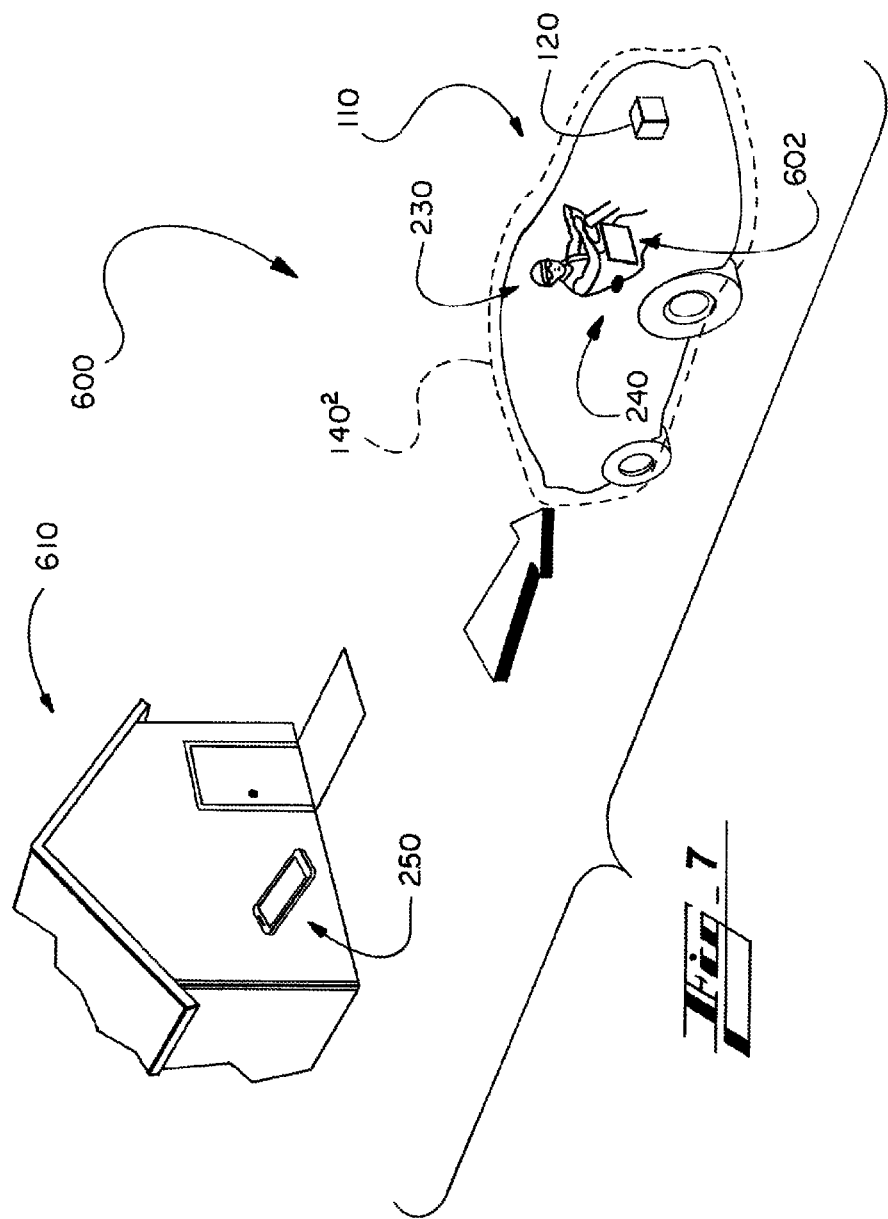
FIG. 7 shows the environment and components of FIG. 6 with the user having moved into a boundary established by the vehicle.

V. FIGS. 6 and 7—Second Example Implementation

FIG. 6 illustrates a second example environment 600, including select components of the vehicle 110, and a space or building 610 that the user 230 is leaving.

The vehicle 110 is shown to include, as an example output device, a display 602, which can be a touch-sensitive, input/output display. The display 602 can be one of the components represented by numeral 260 in FIG. 2.

The space or building 610 is referenced mostly as a building 610 below, though the space or building 610 can be any of a wide variety of places, such as the user's house, for example, or office, a location of a meeting, friend, relative, restaurant, pub, gym, a public park, or other establishment, building, space, or location.

The vehicle 110 is shown in association with one of the example sensed spaces $140^2$, used at least to confirm whether the tracked object 250 is present in the vehicle 110.

Presence of the user 230 can be determined in any suitable manner, including any of those described above in connection with FIGS. 4 and 5. In a contemplated embodiment, presence of the user 230 is determined based on the vehicle 110 being turned on, started/cranked up, or driven.

In various embodiments, presence of the user 230 is determined in another manner, such as by biometric identification or keyfob detection at the vehicle 110, but an alert is not provided in these embodiments, to the user unless and until the vehicle is started and/or driven, and the vehicle 110 determines that the tracked object 250 is not in the vehicle 110, or sensed boundary $140^2$.

FIG. 7 shows the environment 600 of FIG. 6 after the user 230 has moved into the boundary $140^2$ established by the vehicle 110.

The sensing and communication device 130 thus determines that the user 230 entered the vehicle 110—i.e., that the user 230 entered the sensed space $140^2$—as an example triggering event, and provides to the controlling apparatus 120 a signal or message indicating user presence.

The controlling apparatus 120 receives the message or signal from the sensing and communication device 130 indicating that the user 230 entered the vehicle 110—i.e., that the user 230 entered the sensed space $140^2$.

In response to determining that the user 230 has entered the vehicle 110, the controlling apparatus 120 determines whether the tracked object(s) 250, associated with the user 230 in the controlling apparatus 120, is with the user—e.g., is in the vehicle 110 or near, such as within a sensed space or boundary, such as the space $140^2$ shown in FIG. 7.

In response to determining that the user 230 is present, and that the tracked object 250 is not present, the controlling apparatus 120 initiates provision of an alert or notification to the user 230. Example alerts include blinking interior lights of the vehicle 110, providing a tone or other audible sound, such as by way of a vehicle speaker system, or providing a haptic feedback, such as vibrating the seat or steering wheel by way of a corresponding actuator. For situations in which the user may be positioned in the vehicle, the alert can be provided by way of a vehicle heads up display or other intra-vehicle hardware device.

Audible feedback can include spoken communication advising the user 230 by pre-set wording indicating the situation—e.g., that the user has forgotten their phone, the phone is not in the vehicle 110, etc.

In various embodiments the alert preferably includes a message to the user by way of the display 602. The message can include visual media, such as text or an image of an object or icon representing the tracked object. An example image is an icon corresponding to the tracked object 250, such as of a phone if the object is a user phone. The message can include text advising the user 230 by pre-set wording indicating the situation—e.g., that the user has forgotten their phone, the phone is not in the vehicle 110, etc.

Structure and operation of the arrangement of FIGS. 2, 3, 6, and 7 are described further below in connection with FIG. 9.

VI. FIGS. 8 and 9—Example Algorithms and Processes

FIG. 8 shows an exemplary algorithm by way of a process flow 800 for implementing the embodiments described above mainly in connection with FIGS. 1-5.

FIG. 9 shows an exemplary algorithm by way of a process flow 900 for implementing the embodiments described above in mainly connection with FIGS. 2, 3, 6, and 7.

Aspects of these algorithms are described elsewhere, including above in connections with FIGS. 1-7.

It should be understood that the steps, operations, or functions of the processes 800, 900 outlined in FIGS. 8 and 9, are not necessarily presented in any particular order and that performance of some or all the steps in an alternative order is possible and is contemplated. The processes can also be combined or overlap, such as one or more steps of one of the processes being performed in the other process.

The steps have been presented in the demonstrated order for ease of description and illustration. Steps can be added, omitted and/or performed simultaneously without departing from the scope of the appended claims. It should also be understood that the illustrated processes 800, 900 can be ended at any time.

In certain embodiments, some or all steps of the processes 800, 900 and/or substantially equivalent steps are performed by a processor, such as the processing hardware unit 204, executing computer-executable instructions stored or included on a computer-readable medium, such as the data storage device 202 of the hardware-based controlling apparatus 120 described above.

VI.A. FIG. 8

The process 800 begins 801 and flow proceeds to decision diamond 802, whereat the processing hardware unit 204, executing code 208 of the storage device 202, determines whether a trigger, or triggering event or condition, has occurred.

The code 208 is in various embodiments configured to have, as an example triggering condition, whether the vehicle 110 is on or running. For instance, if the user 230 is known or assumed to be the driver, and the vehicle is being driven or still on otherwise, the vehicle 110 does not at that point need to process separately, or again, whether the user 230 has left the vehicle 110 without the tracked object 250.

For some other cases, the code 208 can be configured to use another triggering condition, such as whether the user 230 has left the vehicle 110. The controlling apparatus 120 can determine whether the user 230 has left the vehicle 110 in any of a variety of ways, such as by way of any of the sensors 216 mentioned above—e.g., seat weight sensor, user-device 240 sensing, biometric sensor, etc. Such triggers would be useful for scenarios in which the user 230 leaves the vehicle 110, and leaves the tracked object 250 behind in the vehicle 110, while the vehicle is still on or running. The user 230 could be a passenger of the vehicle 110, for instance, and exit the vehicle 110, without the tracked device 250, while the vehicle is still on. Or the user 230 could be a driver who exits the vehicle 110, without turning the vehicle off, and leaves the vehicle 110 to another person, such as spouse, to drive, but unintentionally without also taking the tracked object 250.

Corresponding functions of the controlling apparatus 120 (such as determining whether the vehicle is on, cranked up, in gear, or being driven, or such as receiving presence data from the user-presence sensors 216 and determining whether the user 230 is in or near the vehicle 110) can be performed by the processing hardware unit 204 executing code of the user-presence determination sub-module 312 of the presence module 304.

Generally, functions related to determining whether the triggering event has occurred, whether using the user-presence determination sub-module, can be performed by the processing hardware unit 204 executing code of the triggering-event sub-module 310 of the presence module 304. The triggering-event sub-module 310 can use the user-presence determination sub-module 312.

Regarding the trigger condition 802 relating to user presence, user presence can be determined automatically by wireless sensing, to determine whether an approaching user 230 is approaching the vehicle, and/or whether a departing user 230 is leaving the vehicle 110. While the term automatically is used, other terms can be used to describe the sensing function or process generally, such as dynamically. In various implementations, the sensing or process can be performed automatically by the system without being initiated to perform the function by the user.

The wireless sensing can include use of RADAR, other motion sensor, or camera technology, as just a few examples. In contemplated embodiments the wireless sensing includes biometric sensing, such as a camera configured to determine whether an approaching or departing person's gait or body or facial qualities indicate that the person is the user.

In various embodiments, the system is configured so that, regarding wireless departure determination, an indication of user departure is not provided until the user is determined by the wireless sensing to have left a predetermined boundary, such as having passed beyond ten feet of the vehicle, or a range of a sensor, such as a camera, laser, RFID sensor, other motion sensor, other short-range or near-field-communications wireless transceiver other short-range or near-field wireless communication device, the like, or other.

The triggering condition 802 can include a consideration of whether an exception condition presently applies. As described above regarding the storage device 202 components, system code can include an exception module comprising code, provided in response to user request or default or updated setting, for instance, indicating at home, or another pre-identified location and being configured to (1) recognize when the user 230 is at the pre-established exception location, or one of multiple pre-established exception locations, and (2) not alert the user based on the recognition (1). The controlling apparatus 120 may be configured so that, when the user 230 is at home, the apparatus 120 does not initiate an alert to advise the user that they left the sensed space 140 (e.g., vehicle) without the tracked object 250.

In contemplated embodiments relating to the exception module, the alert is not generated or sent because the code causes the system to, in response to the recognition (1), enter an exception mode whereby the system does not determine whether the object is in the sensed space 140.

As with all components, modules, functions, and the like, herein, the exception mode can be referred to by other terms, such as a non-alert mode, a non-tracking mode, similar, or other. The exception pre-condition can be part of the triggering consideration 802, as just one example placement for the pre-condition in the algorithm 800.

The triggering condition can include more than one condition, such as by including a user proximity condition (e.g., the user has walked away from the vehicle) and also a non-exception condition (e.g., the user is not at home).

In response to determining at diamond 802 that the triggering condition has not occurred, flow proceeds along path $802^1$ to repeat the decision 802. The loop in some embodiments includes a time-delay 804. The delay can be set by default and in some cases adjusted. Example delays include 5, 10, and 15 seconds.

In response to a positive determination at diamond 802, flow proceeds along path $802^2$ to block 806 whereat the processing hardware unit 204 logs a time that the triggering event occurred, such as a time of key off condition. The time logged could be useful in later operations, such as determined whether the system has timed off at block 812.

At diamond 808, the processing hardware unit 204 determines whether there are any tracked objects 250 associated or paired with a subject user account. The function can include, or be preceded by the processing hardware unit 204 determining a subject user, such as by biometric identification of a user 230 in the vehicle 110 or by a user-carried or -worn device 240. In a contemplated embodiment, the tracked object 250 is used at this stage to identify a user 230 in the vehicle 110.

If the processing hardware unit 204 at diamond 808 does not determine any tracked objects 250 associated with the user account, flow proceeds along path $808^1$, whereby the process 800 can end 809 or be repeated.

If the processing hardware unit 204 at diamond 808 determines that there is at least one tracked object 250 associated with the user account, flow proceeds along path $808^2$ to diamond 810 whereat the processing hardware unit 204 determines whether the user 230 is present in the vehicle 110. The controlling apparatus 120 can determine whether the user 230 is in the vehicle or has left the vehicle 110. The determination is made in any of a variety of ways, such as by way of any of the user-sensing or communicating device 216 mentioned above—e.g., seat weight sensor, user-device 240 sensing, biometric sensor, etc.

These functions of the controlling apparatus 120, such as receiving presence data from the user-presence sensors 216 and determining whether the user 230 is in or near the vehicle 110, can be performed by the processing hardware unit 204 executing code of the user-presence determination sub-module 312 of the presence module 304.

If the processing unit 204 determines at diamond 810 that the user 230 is present in the vehicle 110, or the applicable sensed space 140, flow proceeds along path $810^1$ to diamond 812 wherein the unit 204 determines whether the system has timed out. In embodiments having this step, the unit 204 will not continue checking endlessly to determine whether the user has left the vehicle. In one embodiment, the system uses the key-off time logged at block 806 to determine whether the system has timed out at diamond 812. The time-out limit can be set by default, and in some cases can be modified, such as by the user or vehicle servicer.

If the processing unit 204 determines at diamond 812 that the system has timed out, flow proceeds along path $812^1$, whereby the process 800 can end 809 or be repeated.

If the system has not timed out, or if the system does not include such a time-out function 812, the processing unit 204 continues along path $812^2$ to determine at diamond 810 whether the user 230 is present in (e.g., has left) the vehicle 110.

If the processing unit 204 determines at diamond 810 that the user 230 is not present in the vehicle 110—i.e., that the user 230 has left the vehicle 110 or the applicable sensed space 140—flow proceeds along path $810^2$ to diamond 814.

At diamond 814 the processing unit 204 determines whether there are any tracked objects 250, paired with the user account, in the vehicle 110 or within an applicable sensed space 140—e.g., the second space $140^2$ corresponding generally to a boundary of the vehicle 110.

The controlling apparatus 120 can determine whether the tracked object 250 is in or near the vehicle 110 or corresponding sensed space 140, in any of a variety of ways, such as by way of any of the sensors or communication devices 218 mentioned above. Corresponding functions of the controlling apparatus 120, such as receiving presence data from the object-presence sensors 218 and determining whether the object 250 is in the vehicle 110, can be performed by the processing hardware unit 204 executing code of the tracked-object presence determination sub-module 314 of the presence module 304.

While embodiments are described primarily in connection with a single user 230 and tracked object, each embodiment can be implemented similarly in connection with multiple objects and one or more users 230.

If the processing unit 204 determines at diamond 814 that the tracked object 250 is not in the vehicle 110—such as by being determined to be with the appropriate sensed space 140 (e.g., vehicle-defined space $140^2$)—then flow proceeds along path $814^1$, whereby the process 800 can end 809 or be repeated.

If the processing unit 204 determines at diamond 814 that the tracked object 250 is left in the vehicle 110—e.g., in the appropriate sensed space 140 (e.g., vehicle-defined space $140^2$)—then flow proceeds along path $814^2$ to diamond 816.

At diamond 816, the processing hardware unit 204 determines whether, despite finding that the tracked object 250 is apparently misplaced, an exception condition exists. As described above regarding the storage device 202 components, system code can include an exception module comprising code, provided in response to user request or default or updated setting, for instance, indicating at home, or another pre-identified location and being configured to (1) recognize when the user 230 is at the pre-established location, or one of multiple pre-established locations, and (2) not alert the user based on the recognition (1). For instance, controlling apparatus 120 may be configured so that, when the user 230 is at home, the apparatus 120 does not initiate an alert to advise the user that they left the sensed space 140 (e.g., vehicle) without the tracked object 250.

If at block 816, the processing hardware unit 204 determines that an exception applies, flow proceeds along path $816^1$ whereby the process 800 can end 809 or be repeated.

If at block 816, the processing hardware unit 204 determines that no exceptions apply, flow proceeds along path $816^2$ to block 818.

At block 818, the processing hardware unit 204 initiates provision of one or more alerts or notifications for receipt by the user 230 to advise the user 230 that the tracked object 250 has been left at the vehicle 110.

The corresponding functions of the controlling apparatus 120, such as determining to initiate provision of an alert or notification, can be performed by the processing hardware unit 204 executing code of the alert-initiation sub-module 316 of the presence module 304. The functions can further lead to or include activating and/or using the alert or notification module 306.

The processing unit 204, executing the activated alert module 306 can provide the alert via any suitable alert communication channel. Example alert communication channels include the output devices 135, 137 mentioned, not limited to vehicle horn and lighting systems. Other example alert communication channels include causing a user-carried or -worn device 240, such as a keyfob, to provide output for receipt the user 230. Example user device output includes audible and/or haptic output. The alert can instead or also include any of text message, email message, automated call, or output by vehicle 110 speakers, for example.

As also referenced, the alert or notification can be customized to notify the user 230, by the format of the alert, of the particular object left in the vehicle. As just examples, a pre-selected tone can be provided from a vehicle or user device 240 speaker if the user 230 left a user phone being the tracked object 250 in the vehicle 110, and a barking sound can be provided if the user 230 left a dog being the tracked object 250 in the vehicle 110.

The process 800 can end or any one or more operations of the process 800 can be performed again.

VI.B. FIG. 9

As provided, FIG. 9 shows an exemplary process flow 900 for implementing the arrangement of FIGS. 6 and 7.

FIGS. 2 and 3 show example components of a computing controller 120 and related vehicle and non-vehicle components used in execution of the processes the present technology.

FIG. 6 shows the second example environment 600, parts of the vehicle 110, and a space or building 610 that the user 230 is leaving. The vehicle 110 is shown to include the hardware-based controlling apparatus 120, the at least one sensing and communication device 130. The vehicle 110 includes a display 602, which can be a touch-sensitive, input/output display. The display, which can be one of the components represented by numeral 260 in FIG. 2, can be of any time and location, such as a dashboard screen, an instruments space display, and a heads-up display (HUD).

The space or building 610 is referenced mostly as a building 610 below, though the space or building 610 can be any of a wide variety of places, such as the user's house, for example, or office, a location of a meeting, friend, relative, restaurant, pub, gym, or other establishment, building, space, or location.

The vehicle 110 is shown in association with one of the example sensed spaces $140^2$, used at least to confirm whether the tracked object 250 is present in the vehicle 110.

The process 900 begins 901 and flow proceeds to decision diamond 902, whereat the processing hardware unit 204, executing code 208 of the storage device 202, determines whether a triggering event or condition, has occurred.

The code 208 can be configured to have, as an example triggering condition, whether the user 230 is near or in the vehicle 110—e.g., within a corresponding boundary $140^2$. Or the triggering condition can include the vehicle 110 being turned on, cranked up, put in gear, or driven.

For implementations in which the system is operating to help keep the user from driving away in the vehicle 110 or being driven away in the vehicle 110 and leaving the tracked object 250 behind, such as in FIGS. 6 and 7, the vehicle 110 does not need to process whether the tracked object 250 is present when the vehicle is not being moved or is apparently not going to be moved imminently.

The controlling apparatus 120 can determine whether the user 230 is in or near the vehicle 110 in any of the ways referenced above. And, again, corresponding functions of the controlling apparatus 120, such as receiving presence data from the user-presence sensors 216 and determining whether the user 230 is in or near the vehicle 110, can be performed by the processing hardware unit 204 executing code of the user-presence determination sub-module 312 of the presence module 304. Functions related to determining whether the triggering event has occurred, whether using the user-presence determination sub-module, can be performed by the processing hardware unit 204 executing code of the triggering-event sub-module 310 of the presence module 304. The triggering-event sub-module 310 can use the user-presence determination sub-module 312.

Regarding the trigger condition 902 relating to user presence, user presence can be determined automatically by wireless sensing, to determine whether an approaching user 230 is approaching the vehicle, and/or whether a departing user 230 is leaving the vehicle 110. While the term automatically is used, other terms can apply, such as dynamically. In one implementation, the process can be performed automatically, being performed by the system without being initiated to perform the function by the user.

Example wireless sensing technologies, e.g., RADAR, motion, camera, and biometric sensing, are described above.

As with the process of FIG. 8, here too the system is configured so that, regarding wireless departure determination, an indication of user departure is not provided until the user is determined by the wireless sensing to have left a predetermined boundary, such as having passed beyond ten feet of the vehicle, or a range of a sensor, such as a camera, laser, RFID sensor, other motion sensor, other short-range or near-field-communications wireless transceiver other short-range or near-field wireless communication device, the like, or other.

The triggering condition 902 can include a consideration of whether an exception condition presently applies. As described above regarding the storage device 202 components, system code can include an exception module comprising code, provided in response to user request or default or updated setting, for instance, indicating at home, or another pre-identified location and being configured to (1) recognize when the user 230 is at the pre-established location, or one of multiple pre-established locations, and (2) not alert the user based on the recognition (1). For instance, controlling apparatus 120 may be configured so that, when the user 230 is at home, the apparatus 120 does not initiate an alert to advise the user that they left the sensed space 140 (e.g., vehicle) without the tracked object 250. In contemplated embodiments relating to the exception module, the alert is not generated or sent because the code causes the system to, in response to the recognition (1), enter an exception mode whereby the system does not determine whether the system does not track the object. As with all components, modules, functions, and the like, herein, the exception mode can be referred to by other terms, such as a non-alert mode, a non-tracking mode, similar, or other. The exception pre-condition can be part of the triggering consideration 902, as just one example placement for the pre-condition in the algorithm 900.

The triggering condition can include more than one condition, such as by including a user proximity condition (e.g., the user has walked away from the vehicle) and also a non-exception condition (e.g., the user is not at home).

In response to determining at diamond 902 that the triggering condition has not occurred, flow proceed along path $902^1$ to repeat the decision 902. The loop in some embodiments includes a time-delay 904, like the delay step 804 of FIG. 8.

In response to a positive determination at diamond 902, flow proceeds along path $902^2$ to block 906 whereat the processing hardware unit 204 logs a time that the triggering event occurred, such as a time of key off condition. The time logged could be useful in later operations, such as determined whether the system has timed off at block 912.

At diamond 908, the processing hardware unit 204 determines whether there are any tracked objects 250 associated or paired with a subject user account. The function can include, or be preceded by the processing hardware unit 204 determining a subject user, such as by biometric identification of a user 230 in the vehicle 110 or by a user-carried device 240 such as a user phone or other user device. In a contemplated embodiment, the tracked object 250 is used at this stage to identify a user 230 in the vehicle 110.

If the processing hardware unit 204 at diamond 908 does not determine that there are any tracked objects 250 associated with the user account, flow proceeds along path $908^1$, whereby the process 900 can end 909 or be repeated.

If the processing hardware unit 204 at diamond 908 determines that there is at least one tracked object 250 associated with the user account, flow proceeds along path $908^2$ to diamond 910 whereat the processing hardware unit 204 determines whether the user 230 is present in the vehicle 110. And, again, corresponding functions of the controlling apparatus 120, such as receiving presence data from the user-presence sensors 216 and determining whether the user 230 is in or near the vehicle 110, can be performed by the processing hardware unit 204 executing code of the user-presence determination sub-module 312 of the presence module 304.

In various embodiments, determining whether the user 230 is present was performed already, at diamond 902, as part of determining whether the trigger condition occurred, and so need not be repeated. That is, step 908 could be skipped, or the step 908 could not be present—in either case, flow can proceed to diamond 914.

The diamond 908 is included for embodiments in which the system is configured so that the triggering condition 902 does not require confirming user presence or does not require only determining user presence, or requires different user presence (e.g., within a loser boundary $140^1$, but not a tighter boundary $140^2$). The triggering condition at step 902 could involve determining that the vehicle 110 was started remotely by the user 230, such as to pre-warm the vehicle on a cold day, and the user 230 is approaching the vehicle—e.g., within the first boundary $140^1$ of FIG. 1. The determination 910 could involve, distinctly, determining if the user is in the vehicle—e.g., within boundaries $140^2$, $140^3$, $140^4$ (reference FIG. 1).

Again, functions of the controlling apparatus 120, such as receiving presence data from the user-presence sensors 216 and determining whether the user 230 is in or near the vehicle 110, can be performed by the processing hardware unit 204 executing code of the user-presence determination sub-module 312 of the presence module 304.

For embodiments in which the step 910 is performed, if the processing unit 204 determines there that the user 230 is not present in or near the vehicle, depending on the configuration, flow proceeds along path $910^1$ to diamond 912 wherein the unit 204 determines whether the system has timed out. In embodiments having this step, the unit 204 will not continue checking endlessly to determine whether the user has reached the vehicle 110. In one embodiment, the system uses the key-off time logged at block 906 to determine whether the system has timed out at diamond 912. The time-out limit can be set by default, and in some cases can be modified, such as by the user or vehicle servicer. The check 912 can help save vehicle power in circumstances such as if the user has approached the vehicle 110 simply to retrieve something from the trunk.

If the processing unit 204 determines at diamond 912 that the system has timed out, flow proceeds along path $912^1$, whereby the process 900 can end 909 or be repeated.

Continuing with this example, for embodiments in which the step 910 is performed, if the system has not timed out at step 912, or if the system does not include such a time-out function 912, the processing unit 204 continues to determine at diamond 910 whether the user 230 is present in the vehicle 110, as indicated by return path $912^2$.

If the processing unit 204 determines at diamond 910 that the user 230 is present in the vehicle 110—i.e., that the user 230 has arrived in the vehicle 110 or the applicable sensed space 140—flow proceeds along path $910^2$ to diamond 914.

At diamond 914 the processing unit 204 determines whether the tracked object(s) 250, determined at block 908 as being associated with the user account, are also in the vehicle 110 or within an applicable sensed space 140, such as the second sensed space $140^2$ corresponding generally to a boundary of the vehicle 110.

The controlling apparatus 120 can determine whether the tracked object 250 is in or near the vehicle 110 or corresponding sensed space 140 in any of the manners mentioned. The function can include use of any of the sensors or communication devices 218 described, such as an RFID reader, Bluetooth transceiver, etc.

Corresponding functions of the controlling apparatus 120, such as receiving presence data from the object-presence sensors 218 and determining whether the tracked object 250 is in or near the vehicle 110, can be performed by the processing hardware unit 204 executing code of the tracked-object-presence determination sub-module 314 of the presence module 304.

If the processing unit 204 determines at diamond 914 that the tracked object 250 is in the vehicle 110, such as by being determined to be within the appropriate sensed space 140 (e.g., vehicle-defined space $140^2$)—then flow proceeds along path $914^1$, whereby the process 900 can end 909 or be repeated.

If the processing unit 204 determines at diamond 914 that the tracked object 250 is not at the vehicle 110, flow proceeds along path $914^2$ to diamond 916.

At diamond 916, the processing hardware unit 204 determines whether, despite finding that the tracked object 250 is apparently misplaced, an exception condition exists. As described above regarding the storage device 202 components, system code can include an exception module comprising code, provided in response to user request or default or updated setting, for instance, indicating at home, or another pre-identified location and being configured to (1) recognize when the user 230 is at the pre-established location, or one of multiple pre-established locations, and (2) not alert the user based on the recognition (1). For instance, controlling apparatus 120 may be configured so that, when the user 230 is at home, the apparatus 120 does not initiate an alert to advise the user that they left the sensed space 140 (e.g., vehicle) without the tracked object 250.

If at block 916, the processing hardware unit 204 determines that an exception applies, flow proceeds along path $916^1$ whereby the process 800 can end 809 or be repeated.

If at block 916, the processing hardware unit 204 determines that no exceptions apply, flow proceeds along path $916^2$ to block 918.

At block 918 the processing unit 204 initiates provision of one or more alerts or notifications for receipt by the user 230 to advise the user that the tracked object 250 is not at the vehicle 110—for example, that the object 110 has been left behind, such as apparently at a last location 610.

Again, corresponding functions of the controlling apparatus 120, such as determining to initiate provision of an alert or notification, can be performed by the processing hardware unit 204 executing code of the alert-initiation sub-module 316 of the presence module 304. The functions can include use of, or lead to activating, the alert or notification module 306.

The processing unit 204, executing the activated alert module 306 can provide the alert via any suitable alert communication channel, such as those discussed above in connection with the alert operation 818 of the process of FIG. 8.

The process 900 can end or any one or more operations of the process 900 can be performed again.

VII. Select Advantages

Many of the benefits and advantages of the present technology are described above. The present section restates some of those and references some others. The benefits described are not exhaustive of the benefits of the present technology.

The present technology allows users to ensure that they keep any of a wide variety of tracked objects with them as desired. Example tracked objects include but are not limited to a user mobile communication device, a medicine container, a badge, pass, or identification, a pet, a child, a satchel, briefcase, a keyfob, etc.

The technology uses a three-body arrangement, including a vehicle, such as an automobile, the tracked object, and the user. User presence can be determined in any of a wide variety of ways, such as based on a wireless or otherwise sensible user device carried or worn by the user, in which case the device could be considered as the third body. In some embodiments, user presence is determined based on biometric, camera, RADAR, or weight-related feedback from one or more vehicle sensors.

In various embodiments, the three bodies need not all be proximate each other to begin functioning of the arrangement. For instance, as described regarding FIGS. 7, 8, and 9, the system can alert the user that they are apparently about to drive away from a location while leaving a tracked object behind at the location.

The arrangement of the present technology can also operate, in various embodiments, to notify the user when they are leaving a tracked object, such as a phone, at a location or at the vehicle even if the user does not have a distinct user device such as a keyfob with them. For instance, if the vehicle is configured to confirm user presence, such as based on a user-provided code or biometric factor provided for entry or vehicle start, or an in-vehicle seat-weight, biometric, or visual sensor, then the vehicle can, upon determining that the tracked object is not present, alert the user that they are apparently about to drive away from a location without the phone, even if the user has also left at the location a user device such as a keyfob. If the keyfob is also associated in the system with the user account as a tracked object, the system can alert the user that they are apparently about to leave without both objects.

VIII. Conclusion

Various embodiments of the present disclosure are disclosed herein. The disclosed embodiments are merely examples that may be embodied in various and alternative forms, and combinations thereof.

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

References herein to how a feature is arranged can refer to, but are not limited to, how the feature is positioned with respect to other features. References herein to how a feature is configured can refer to, but are not limited to, how the feature is sized, how the feature is shaped, and/or material of the feature. For simplicity, the term configured can be used to refer to both the configuration and arrangement described above in this paragraph.

References indicating direction are not made in limiting senses. For example, references to upper, lower, top, bottom, or lateral, are not provided to limit the manner in which the technology of the present disclosure can be implemented. While an upper surface may be referenced, for example, the referenced surface need not be vertically upward, in a design, manufacture, or operating reference frame, or above any other particular component, and can be aside of some or all components in design, manufacture and/or operation instead, depending on the orientation used in the particular application.

Any component described or shown in the figures as a single item can be replaced by multiple such items configured to perform the functions of the single item described. Likewise, any multiple items can be replaced by a single item configured to perform the functions of the multiple items described.

In some instances, well-known components, systems, materials or processes have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

The above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed:

1. A system, for implementation at a user structure, in which a system user is at times positioned to monitor presence of a tracked object using a three-body arrangement including the system user, a tracked object, and a system controlling apparatus, the system comprising:
    a hardware-based processing unit of the system controlling apparatus; and
    a data storage device, of the system controlling apparatus, comprising:
        a user-presence module comprising code that, when executed by the hardware-based processing unit, causes the processing unit to determine, based on wireless sensing, whether the system user has entered a first sensed space having a boundary external to the user structure;
        an object-presence module comprising code that, when executed by the hardware-based processing unit, causes the processing unit to determine, based on tracked-object-presence data, whether the tracked object is present within a second sensed space; and
        an alert module comprising code that, when executed by the hardware-based processing unit, causes the processing unit to, in response to determining that (i) the system user entered the first sensed space and (ii) the tracked object is present within the second sensed space, initiate provision of a system-user alert communication to indicate that the tracked object is present within the second sensed space or is not with the user.

2. The system of claim 1 wherein:
    the data storage device comprises an exception module having code that, when executed, causes the hardware-based processing unit to determine whether an exception condition is satisfied; and
    the exception condition is satisfied if the processing unit, executing the user-presence module code, determines that the system user or the user structure is positioned at a pre-determined exception location.

3. The system of claim 2 wherein at least one of (i) providing the system-user alert communication and (ii) determining, based on the wireless sensing, whether the system user has entered the first sensed space, is performed only if the exception condition is not satisfied.

4. The system of claim 1 wherein the user-presence module, when executed, determines, based on the wireless sensing, whether the system user has entered the first sensed space.

5. The system of claim 1 wherein the wireless sensing includes biometric functions for use in determining whether a person entering the first sensed space is the system user.

6. The system of claim 1 wherein the system is a vehicle system and the user structure is a transportation vehicle.

7. The system of claim 1 wherein the presence module code, when executed, causes the hardware-based processing unit to determine whether the tracked object is present within the second sensed space in response to determining that the system user approached and entered the first sensed space external to the user structure.

8. The system of claim 1 wherein the first sensed space and the second sensed space are generally coextensive.

9. The system of claim 1 wherein the tracked object is a wireless communication device configured specifically to be part of or connected to at least one of:
    a system-user medicine container;
    a system-user badge, pass, or identification; and
    a user satchel or other container.

10. The system of claim 1 wherein the presence module is configured to cause the hardware-based processing unit to receive the tracked-object-presence data from a short-range or near-field-communications wireless device.

11. The system of claim 1 wherein the system-user alert communication is provided by way of a transportation vehicle component.

12. The system of claim 1 wherein providing the system-user alert communication comprises at least one of:
    actuating a sound actuator associated with the user structure;
    illuminating lights associated with the user structure;
    providing an audible message by way of a user-structure speaker;
    providing a textual or otherwise visual message by way of a user-structure display;
    sending a text message to a text address associated with the system user; and
    sending an email message to an email address associated with the system user.

13. The system of claim 1 wherein the wireless sensing is performed by a presence-detection device, a motion-detection device, or a proximity-detection device.

14. A system, for implementation at a user structure, in which a system user is at times positioned to monitor presence of a tracked object using a three-body arrangement including the system user, a tracked object, and a system controlling apparatus, the system comprising:
    a hardware-based processing unit of the system controlling apparatus; and
    a data storage device, of the system controlling apparatus, comprising:
        a user-presence module comprising code that, when executed by the hardware-based processing unit, causes the processing unit to determine, based on wireless sensing, whether the system user has moved from within a first sensed space to outside of the first sensed space, the first sensed space having a boundary external to the user structure;
        an object-presence module comprising code that, when executed by the hardware-based processing unit, causes the processing unit to determine, based on tracked-object-presence data, whether the tracked object is present within a second sensed space; and an alert module comprising code that, when executed by the hardware-based processing unit, causes the processing unit to, in response to determining that (i) the user has moved to outside of the first sensed space bounded external to the user structure and (ii) the tracked object is present within the second sensed space, initiate provision of a system-user alert communication to indicate the tracked object is present within the second sensed space.

15. The system of claim 14 wherein:

the data storage device comprises an exception module having code that, when executed, causes the hardware-based processing unit to determine whether an exception condition is satisfied; and the exception condition is satisfied if the system determines that the system user or user structure is positioned at a pre-determined exception location.

16. The system of claim 15 wherein the alert communication is only provided if the exception condition is not satisfied.

17. The system of claim 15 wherein the processor, executing the user-presence module, determines whether the system user has moved from within the first sensed space to outside of the first sensed space only if the exception communication is not satisfied.

18. The system of claim 14 wherein the user structure is a transportation vehicle.

19. The system of claim 14 wherein the second sensed space has a boundary at the user structure.

20. The system of claim 14 wherein the object-presence module code, when executed, determines whether the tracked object is present within the second sensed space in response to determining that the system user exited, or is not present in, the first space external to the user structure.

21. A system, for use in monitoring presence of a tracked object, in relation to multiple user structures, using a three-body object-tracking arrangement including a system user, a tracked object, and a respective user structure of the multiple user structures, the system comprising:

a storage device comprising three-body object-tracking code (i) including an object-tracking user profile having the three-body object-tracking arrangement and (ii) configured to:

communicate with respective controlling apparatus of multiple controlling apparatus associated respectively with the multiple user structures;

send the object-tracking user profile to the respective controlling apparatus; and cause respective controlling apparatus, to which the system provides the object-tracking user profile, to:

determine, based on the three-body object-tracking arrangement, whether the tracked object is not positioned as intended by the system user with respect to the respective user structure; and provide a user-alert communication via hardware in response to determining that the object is not positioned as intended.

22. The system of claim 21, wherein respective user structures at which the object-tracking user profile is shared and implemented include a transportation vehicle and a building structure.

23. The system of claim 22, wherein the building structure includes an office building.

24. The system of claim 22, wherein the building structure includes a short-term rental, user home, or user apartment.

25. The system of claim 21, wherein respective user structures at which the object-tracking user profile is shared and implemented include a first transportation vehicle and a second transportation vehicle.

26. The system of claim 25, wherein the second transportation vehicle is a short-term rental vehicle.

27. The system of claim 21, wherein the storage device is a mobile storage device.

28. The system of claim 21, wherein the three-body object-tracking code comprises:

an implementation module that, when executed by a hardware-based processing unit of the respective controlling apparatus, determines, based on the three-body object-tracking profile, whether the tracked object is not positioned as intended by the system user with respect to the respective user structure; and a user-communication module that, when executed by the tracking profile, initiates providing the user-alert communication via the hardware in response to determining that the object is not positioned as intended.

29. The system of claim 21, wherein the object-tracking user profile comprises an identifier associated uniquely with the tracked object.

* * * * *